(12) United States Patent
Day et al.

(10) Patent No.: US 12,545,513 B1
(45) Date of Patent: Feb. 10, 2026

(54) AUTOMATED CONTAINER ACCUMULATION AND DELIVERY SYSTEMS AND METHODS

(71) Applicant: Amazon Technologies, Inc., Seattle, WA (US)

(72) Inventors: John Daryl Day, Hendersonville, TN (US); Raashid Mohammed, Lynnwood, WA (US); Ruben Brignoni, Forest City, FL (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 17/690,828

(22) Filed: Mar. 9, 2022

(51) Int. Cl.
*B65G 1/08* (2006.01)
*B65G 1/02* (2006.01)
*B65G 1/04* (2006.01)
*B65G 59/06* (2006.01)

(52) U.S. Cl.
CPC ............... *B65G 1/08* (2013.01); *B65G 1/026* (2013.01); *B65G 1/0471* (2013.01); *B65G 1/0485* (2013.01); *B65G 59/062* (2013.01); *B65G 2201/0235* (2013.01); *B65G 2203/0233* (2013.01); *B65G 2203/042* (2013.01)

(58) Field of Classification Search
CPC ........ B65G 1/08; B65G 1/026; B65G 1/0471; B65G 1/0485; B65G 59/062; B65G 2201/0235; B65G 2203/0233; B65G 2203/042
See application file for complete search history.

(56) References Cited

U.S. PATENT DOCUMENTS

| | | | | |
|---|---|---|---|---|
| 3,750,804 A | * | 8/1973 | Lemelson | G07F 11/1657 414/280 |
| 3,757,971 A | * | 9/1973 | Frish | B65G 57/00 414/927 |
| 4,501,528 A | * | 2/1985 | Knapp | B65G 1/08 221/13 |
| 4,550,551 A | * | 11/1985 | DeSantis | B65G 47/902 198/750.12 |
| 4,553,375 A | * | 11/1985 | DeSantis | B65G 47/902 414/733 |
| 4,569,183 A | * | 2/1986 | DeSantis | F27D 3/0021 198/750.12 |
| 4,610,126 A | * | 9/1986 | DeSantis | F27D 3/0021 53/446 |
| 4,621,745 A | * | 11/1986 | Grace | B65G 1/08 221/75 |
| 5,111,963 A | * | 5/1992 | Grace, Sr. | G07F 11/52 221/75 |

(Continued)

*Primary Examiner* — Saul Rodriguez
*Assistant Examiner* — Ashley K Romano
(74) *Attorney, Agent, or Firm* — Athorus, PLLC

(57) ABSTRACT

Automated container accumulation and delivery systems and methods may include a magazine body, a slide, and a workstation. The magazine body may receive and store a plurality of containers in vertical magazine lanes. Upon request, a container may be released from a lowest position of a magazine lane, and the slide may guide the released container to the workstation for processing. In addition, remaining containers within the magazine lane from which the container was released may be moved or indexed downward in order to prepare another container for release from the lowest position of the magazine lane responsive to a subsequent request.

18 Claims, 10 Drawing Sheets

(56) References Cited

U.S. PATENT DOCUMENTS

| | | | | |
|---|---|---|---|---|
| 5,201,397 | A * | 4/1993 | Isaacs | B07C 1/04 |
| | | | | 271/69 |
| 5,547,336 | A * | 8/1996 | Whiteman | B65G 59/067 |
| | | | | 271/169 |
| 5,653,327 | A * | 8/1997 | Buday, Jr. | B65G 47/54 |
| | | | | 198/408 |
| 5,779,094 | A * | 7/1998 | Stingel, Jr. | B65G 1/08 |
| | | | | 221/75 |
| 6,142,336 | A * | 11/2000 | Freudelsperger | B65G 59/067 |
| | | | | 221/268 |
| 6,152,670 | A * | 11/2000 | Onnerlov | B65H 19/305 |
| | | | | 242/561 |
| 6,409,449 | B1 * | 6/2002 | Freudelsperger | B65G 1/1373 |
| | | | | 221/12 |
| 6,491,154 | B2 * | 12/2002 | Ydoate | B65G 47/31 |
| | | | | 198/444 |
| 6,682,065 | B2 * | 1/2004 | Leonarde | B65H 3/0816 |
| | | | | 271/107 |
| 6,971,833 | B1 * | 12/2005 | Freudelsperger | B65G 1/1378 |
| | | | | 414/268 |
| 9,181,047 | B2 * | 11/2015 | Redman | B65G 59/067 |
| 9,238,558 | B2 * | 1/2016 | Houck | B65H 3/44 |
| 10,046,926 | B2 * | 8/2018 | Redman | B65G 59/063 |
| 2006/0254221 | A1 * | 11/2006 | Guttinger | B65B 5/068 |
| | | | | 53/542 |
| 2009/0053985 | A1 * | 2/2009 | Topfer | B65G 59/062 |
| | | | | 452/51 |
| 2017/0113890 | A1 * | 4/2017 | Bier | B65H 3/24 |
| 2022/0032487 | A1 * | 2/2022 | Bauer | B26D 7/0683 |
| 2022/0402695 | A1 * | 12/2022 | Fjeldheim | B65G 1/0464 |
| 2023/0219753 | A1 * | 7/2023 | Bates | B65G 1/1373 |
| | | | | 414/277 |

\* cited by examiner

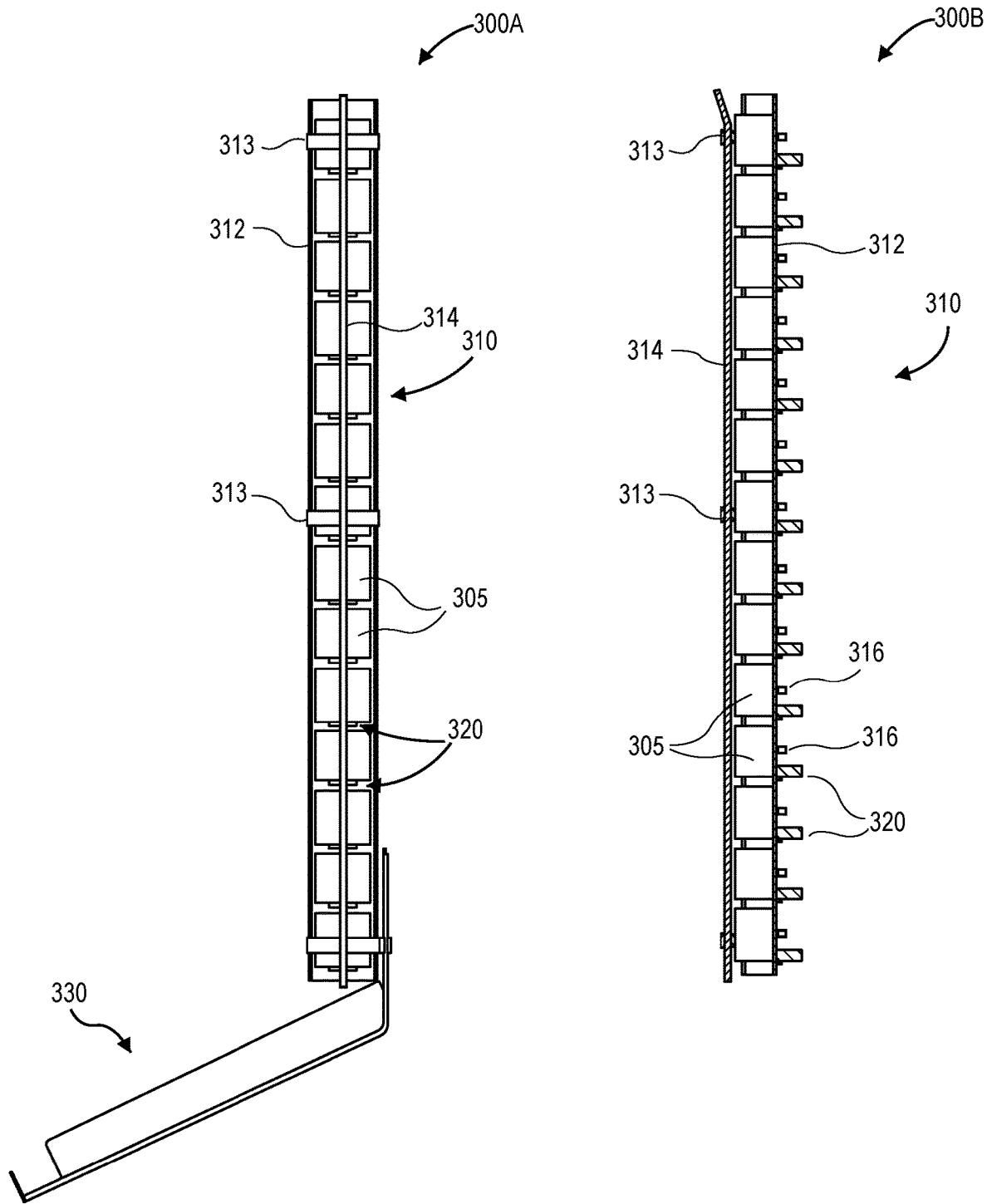
FIG. 3A  FIG. 3B

AUTOMATED CONTAINER ACCUMULATION AND DELIVERY SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes may pack items into boxes, totes, or other containers for shipping. However, receipt, storage, sortation, transport, accumulation, and delivery of containers within material handling facilities are generally manual, time-consuming, and expensive processes. Accordingly, there is a need for reliable and efficient automated systems and methods to accumulate and deliver containers with respect to various processes within material handling facilities.

BRIEF DESCRIPTION OF THE DRAWINGS

FIG. 3A is a schematic, front view diagram of an example magazine lane of an automated container accumulation and delivery system, in accordance with implementations of the present disclosure.

FIG. 3B is a schematic, right side view diagram of an example magazine lane of an automated container accumulation and delivery system, in accordance with implementations of the present disclosure.

DETAILED DESCRIPTION

Figure 1:
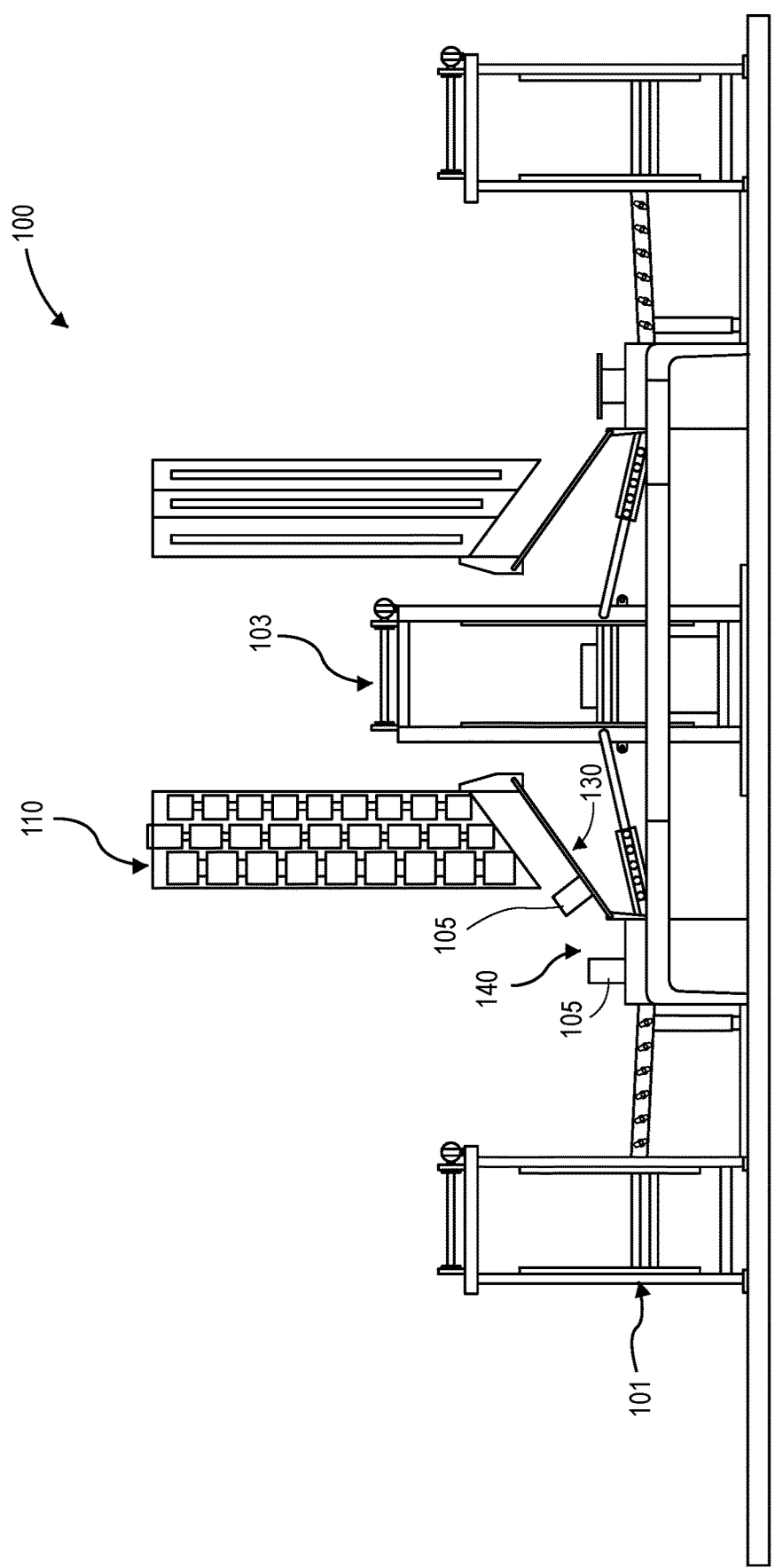
FIG. 1 is a schematic, front view diagram of an example processing station having an automated container accumulation and delivery system, in accordance with implementations of the present disclosure.

As is set forth in greater detail below, implementations of the present disclosure are directed to automated container accumulation and delivery systems and methods that may receive, store, sort, release, and deliver containers in a reliable and efficient manner to support various operations within a material handling facility, such as packing, picking, sortation, storage, transport, shipping, or other operations.

In example embodiments, a container may comprise a box, e.g., a cardboard box, which may be erected or assembled by an automatic case or box erector. For example, the box may be partially or fully erected or assembled, such that the box includes a base, one or more side surfaces, and/or one or more flaps. In other example embodiments, a container may comprise a bin, tote, or other similar container, and the container may comprise a base, one or more side surfaces, and/or one or more flaps, lids, covers, or other portions.

In example embodiments, the container accumulation and delivery systems described herein may receive containers in partially or fully erected configurations or arrangements. For example, the container accumulation and delivery systems may comprise a magazine body having one or more magazine lanes configured to receive, accumulate, and release containers in a substantially vertical arrangement, e.g., by receiving containers at an upper portion thereof and releasing containers from a lower portion thereof. Actuation mechanisms associated with each magazine lane may support and move containers between vertical positions of the magazine lane, such that the containers may be lowered substantially sequentially from top to bottom, e.g., at least partially due to gravity.

In some example embodiments, upon release of containers from a magazine lane, a slide may receive and guide the containers along a length of the slide toward a processing station, workstation, table, or other work surface. The slide may provide a controlled movement and transfer of the containers from the magazine lanes of the magazine body to the workstation. In addition, the workstation or other work surface may be movable, e.g., adjustable in vertical height, to improve ergonomics for associates. Further, the slide may move vertically with the workstation and relative to the magazine body, and/or the slide may pivot relative to the workstation and/or the magazine body to reliably provide containers at any desired height of the workstation.

During operation of a processing station or workstation, an associate may trigger or initiate a request for a container, e.g., by scanning an item, by activating an input element, by initiating via a touchscreen, or by other methods, and a control system may receive the request and cause release of the requested container from a magazine lane of the magazine body associated with the processing station. A slide may controllably guide the container from the magazine lane to the work surface, and an associate may utilize the container to perform one or more operations at the processing station. In addition, upon release of the requested container from the magazine lane, remaining containers within the magazine lane may be indexed, moved, or actuated within the magazine lane, e.g., moved down one or more positions within the magazine lane to prepare for release of one or more additional containers upon receiving subsequent requests.

Using the container accumulation and delivery systems and methods described herein, containers may be stored, sorted, released, and delivered to processing stations, workstations, or other portions of a material handling facility as desired. In alternative example embodiments, the container accumulation and delivery systems and methods may be utilized as buffer or storage systems at various stages of container handling or transport within a facility, e.g., between an upstream conveyance system and a downstream conveyance system. In further example embodiments, the container accumulation and delivery systems and methods may be utilized as buffer or storage systems for inbound or received containers, or for outbound or packed containers, e.g., to facilitate receipt, sorting, storage, transport, shipping, or other processing of containers into and/or out of the facility.

FIG. 1 is a schematic, front view diagram 100 of an example processing station having an automated container accumulation and delivery system, in accordance with implementations of the present disclosure.

The example processing station may form a portion of a material handling facility that is configured to receive, sort, store, process, pick, pack, and/or ship one or more items using one or more containers. For example, the one or more items may comprise books, electronics, housewares, clothing, food, sporting goods, games, toys, or various other types of items or objects. In addition, the one or more containers may comprise boxes, bins, totes, crates, or various other types of containers that may be partially or fully erected or assembled, and that may be transported, sorted, stored, stacked, moved, released, and delivered between various portions of a material handling facility.

In example embodiments, the example processing station may comprise an inbound conveyance mechanism 101, an outbound conveyance mechanism 103, and an example automated container accumulation and delivery system positioned generally between the inbound conveyance mechanism 101 and the outbound conveyance mechanism 103. For example, the automated container accumulation and delivery system may comprise a magazine body 110 having one or more magazine lanes, a slide 130, and a workstation or work surface 140.

The inbound conveyance mechanism 101 may comprise one or more conveyors, rollers, belts, robotic arms, autonomous vehicles, or other automated machinery or equipment, and the inbound conveyance mechanism 101 may move or transfer one or more items from upstream stations or processes to the processing station for various operations, such as sortation, storage, picking, packing, or others. The outbound conveyance mechanism 103 may also comprise one or more conveyors, rollers, belts, robotic arms, autonomous vehicles, or other automated machinery or equipment, and the outbound conveyance mechanism 103 may move or transfer one or more items and/or containers from the processing station to downstream stations or processes for various operations, such as sortation, storage, picking, packing, shipping, or others.

The magazine body 110 of the automated container accumulation and delivery system may comprise one or more magazine lanes, and each magazine lane may include a plurality of vertical positions that are configured to receive containers 105 of one or more sizes or shapes. Generally, the plurality of vertical positions of each magazine lane may have associated length and width dimensions to receive containers 105 having similar length and width dimensions, within certain tolerances, and the plurality of vertical positions of each magazine lane may also receive containers 105 having variable heights. In other example embodiments described herein, the dimensions of the plurality of vertical positions of individual magazine lanes may be modified or adjusted in order to receive containers 105 having different associated dimensions.

The magazine lanes may receive containers 105 at an upper portion thereof from various container transport systems, such as conveyors, rollers, belts, pinch belt transport systems, robotic arms, autonomous vehicles, or other automated machinery or equipment. In addition, the magazine lanes may move or index the containers 105 down through the various vertical positions of each magazine lane for subsequent release at a lower portion thereof.

Upon release of a container from a lowest vertical position of a magazine lane, the slide 130 may guide the container from the magazine body 110 to the work surface 140. At or proximate the work surface 140, a robotic arm, other automated machinery or equipment, or a human associate may process one or more items relative to the container 105. For example, a human associate may pack or place one or more items received from an upstream station or process via the inbound conveyance mechanism 101 into the container 105 on the work surface 140, and then, the human associate may transfer the container 105 having the one or more items to a downstream station or process via the outbound conveyance mechanism 103.

Although FIG. 1 illustrates a particular number, type, configuration, and arrangement of various components of an example processing station, other example embodiments may include various other numbers, types, configurations, or arrangements of the various components. For example, the magazine body may have various numbers of magazine lanes, a plurality of magazine bodies and associated slides may be associated with a work surface, a plurality of work surfaces may be positioned next to or adjacent each other, other numbers, types, and arrangements of conveyance mechanisms may be included, and/or various other modifications or configurations are possible.

Further, although the processing station of FIG. 1 is generally described in the context of a packing operation, other example embodiments may perform various other types of operations using the container accumulation and delivery systems described herein. For example, in a picking operation, a container 105 having one or more items may be received at the work surface from the container accumulation and delivery system. Then, one or more items may be removed from the container 105 at the work surface, and the items may be transferred to a downstream station or process via a first conveyance mechanism, while the container 105 may also be transferred to a downstream station or process via a second conveyance mechanism. Various other types of operations may be performed with respect to containers 105 and/or one or more items using further example embodiments of processing stations having container accumulation and delivery systems as described herein, such as inbound receive, storage, sortation, buffering, staging, transport, shipping, or others.

Figure 2:
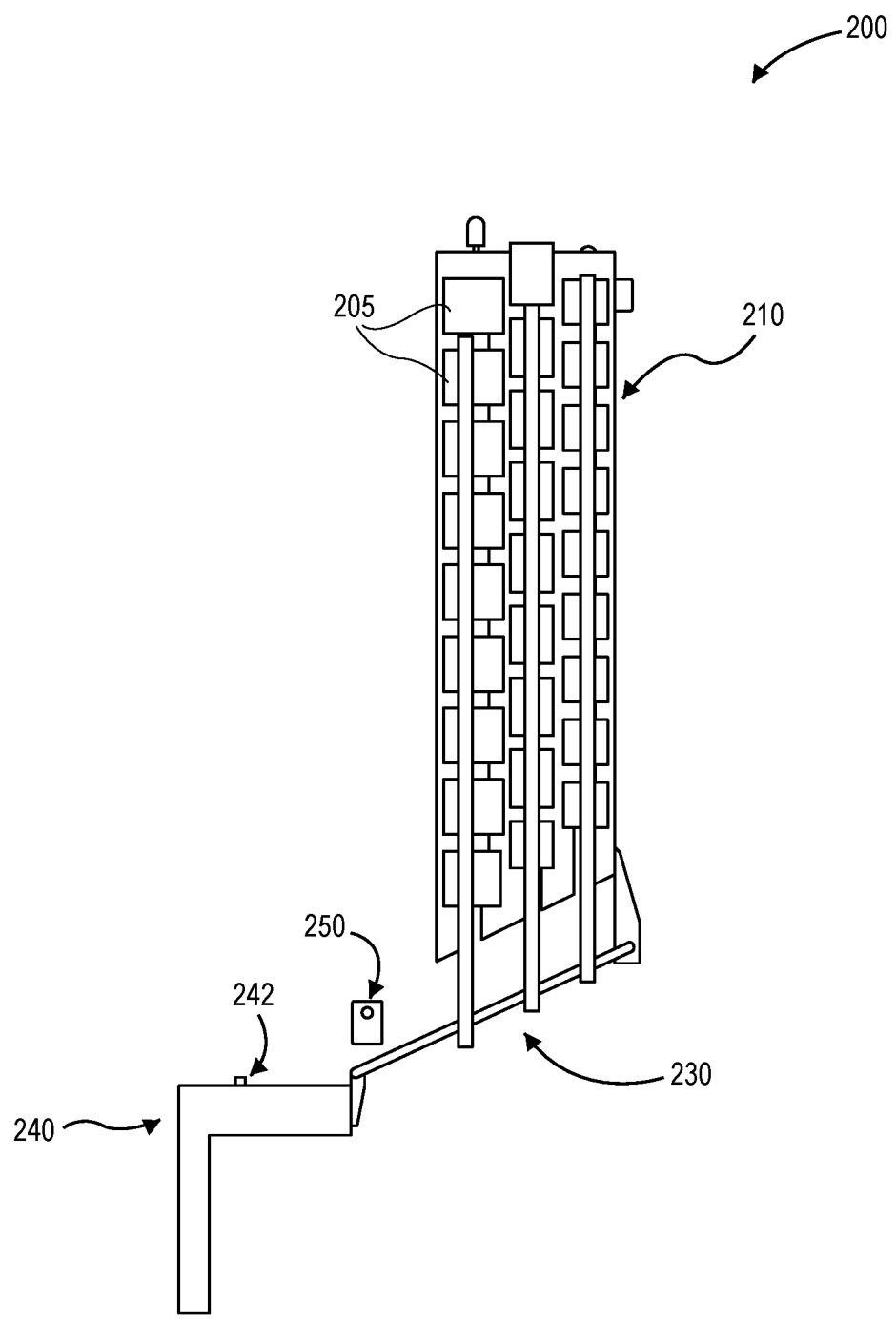
FIG. 2 is a schematic, front view diagram of an example automated container accumulation and delivery system, in accordance with implementations of the present disclosure.

FIG. 2 is a schematic, front view diagram 200 of an example automated container accumulation and delivery system, in accordance with implementations of the present disclosure.

As shown in FIG. 2, the example automated container accumulation and delivery system may include a magazine body 210 configured to receive and release a plurality of containers 205, a slide 230, a work surface 240 having a stop 242, and/or a sensor or reader 250. Various components described herein with respect to FIG. 2 may have any and all of the features of components having similar reference numerals described herein with respect to any other Figures.

The magazine body 210 may have one or more magazine lanes, e.g., vertical lanes or columns, that each include a plurality of vertical positions that are configured to receive containers 205 at an upper portion thereof and to release containers from a lower portion thereof. Individual magazine lanes may be sized or dimensioned to receive containers having similar associated dimensions. In addition, the magazine lanes may include actuation mechanisms to move or index containers down through various vertical positions of the lanes from the upper portion to the lower portion. Further details of an example magazine body are described herein at least with respect to FIGS. 3A-4B.

Upon release of a container 205 from a magazine lane of the magazine body 210, the slide 230 may receive the container and guide the container toward the work surface 240. The slide 230 may comprise an active or passive slide that controllably and reliably guides containers from the magazine body 210 toward the work surface 240. Further details of an example slide are described herein at least with respect to FIGS. 5A-5C. In addition, the work surface 240 may include a stop 242, such as a bar, post, beam, edge, bump, protrusion, or other feature, to positively stop movement of a container that is received on the work surface 240 from the slide 230.

Further, one or more sensors 250 may be positioned adjacent or proximate various portions of the slide 230. Moreover, one or more sensors 250 may be positioned adjacent or proximate various portions of the magazine lanes of the magazine body 210 and/or various portions of the work surface 240. The sensors 250 may comprise imaging sensors, scanning devices, photoeyes, proximity sensors, presence detection sensors, ranging sensors, radiofrequency identification (RFID) readers, or other types of sensors to detect and/or identify containers within portions of the container accumulation and delivery system. For example, a particular container may be detected, identified, and/or tracked at various positions within a magazine lane of the magazine body 210, during guided movement upon the slide 230, and/or during processing on the work surface 240.

In additional example embodiments, one or more auxiliary processing devices, such as printers, label applicators, or similar types of devices, may also be positioned adjacent or proximate various portions of the slide 230, various portions of the magazine lanes of the magazine body 210, and/or various portions of the work surface 240. Such auxiliary processing devices may print information directly onto containers, may print and apply labels onto containers at various portions of the container accumulation and delivery system, and/or may perform various other auxiliary functions or operations with respect to containers.

Although FIG. 2 illustrates a particular number, type, configuration, and arrangement of various components of an example automated container accumulation and delivery system, other example embodiments may include various other numbers, types, configurations, or arrangements of the various components. For example, the magazine body may have various numbers of magazine lanes and/or various numbers of vertical positions within each magazine lane, a plurality of magazine bodies and associated slides may be associated with a work surface, a plurality of work surfaces may be positioned next to or adjacent each other, other numbers, types, and arrangements of sensors and/or auxiliary devices may be included, and/or various other modifications or configurations are possible.

Figure 3C:
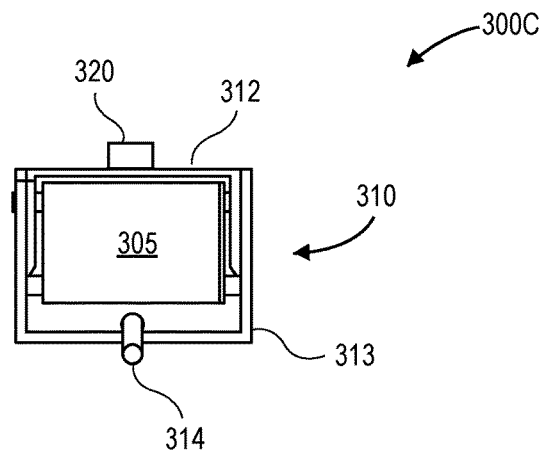
FIG. 3C is a schematic, top view diagram of an example magazine lane of an automated container accumulation and delivery system, in accordance with implementations of the present disclosure.

FIG. 3A is a schematic, front view diagram 300A of an example magazine lane of an automated container accumulation and delivery system, in accordance with implementations of the present disclosure. FIG. 3B is a schematic, right side view diagram 300B of an example magazine lane of an automated container accumulation and delivery system, in accordance with implementations of the present disclosure. FIG. 3C is a schematic, top view diagram 300C of an example magazine lane of an automated container accumulation and delivery system, in accordance with implementations of the present disclosure.

As shown in FIGS. 3A-3C, the example automated container accumulation and delivery system may include a magazine body 310 having one or more magazine lanes configured to receive and release a plurality of containers 305, in which the magazine body 310 may comprise a frame 312, one or more brackets 313, one or more vertical guides 314, one or more sensors 316, and/or one or more actuation mechanisms 320. As described herein, the magazine body 310 may include a plurality of vertical positions that are configured to receive containers 305 at an upper portion thereof and release containers 305 at a lower portion thereof. Further, a slide 330 may be movably and/or pivotably coupled to and/or positioned adjacent to a portion of the magazine body 310 to receive containers 305 that are released from the lower portion of the magazine body 310. Various components described herein with respect to FIGS. 3A-3C may have any and all of the features of components having similar reference numerals described herein with respect to any other Figures.

The frame 312 of the magazine body 310 may comprise one or more beams, poles, rods, brackets, surfaces, plates, or other structural members that at least partially form a vertical lane, column, channel, or shaft into which one or more containers 305 may be received. For example, the frame 312 may form surfaces or edges that support one or more corners or edges, e.g., two adjacent corners or edges, of containers received therein. Alternatively or in addition, the frame 312 may form surfaces or edges that support one or more faces, e.g., two or three adjacent faces, of containers received therein. In other examples, the frame 312 may form surfaces or edges that support various combinations of corners, edges, and/or faces of containers received therein.

In the example illustrated in FIGS. 3A-3C, the frame 312 may support three adjacent faces, or may support two adjacent corners or edges, of containers received therein. The various structural members of the frame 312 may be formed of various materials, such as metals, plastics, composites, other materials, or combinations thereof. In addition, the structural members of the frame 312 may be coupled or joined to each other by various methods, such as welds, adhesives, fasteners, rivets, or other types of attachment methods.

In some example embodiments, some of the structural members of the frame 312 may be adjustable or movable relative to each other, such that one or more dimensions, e.g., length and/or width dimensions, of the frame 312 may be modified or adjusted to accommodate different associated dimensions of containers to be received therein. For example, some of the structural members may have sliding, rolling, telescoping, extendible, and/or retractable connections or couplings to each other in order to enable adjustment of one or more dimensions of the frame 312.

The vertical guides 314 of the magazine body 310 may also comprise one or more beams, poles, rods, brackets, surfaces, plates, or other structural members that at least partially form a vertical lane, column, channel, or shaft into which one or more containers 305 may be received. The vertical guides 314 may be coupled to the frame 312 of the magazine body 310 via one or more brackets 313, such that the frame 312, brackets 313, and vertical guides 314 together may substantially completely form a vertical lane, column, channel, or shaft into which one or more containers 305 may be received. For example, the vertical guides 314 may form surfaces or edges that support one or more of faces, e.g., one or two faces, of containers received therein. Alternatively or in addition, the vertical guides 314 may form surfaces or edges that support one or more corners or edges, e.g., one or two adjacent corners or edges, of containers received therein. In other examples, the vertical guides 314 may form surfaces or edges that support various combinations of corners, edges, and/or faces of containers received therein.

In the example illustrated in FIGS. 3A-3C, the vertical guides 314 may support one face of containers received therein, in which the face is not already supported by the frame 312, and/or in which the face is opposite from a face between adjacent corners or edges of containers that are supported by the frame 312. The vertical guides 314 may be formed of various materials, such as metals, plastics, composites, other materials, or combinations thereof. In addition, the vertical guides 314 and brackets 313 may be coupled or joined to each other and the frame 312 by various methods, such as welds, adhesives, fasteners, rivets, or other types of attachment methods.

In some example embodiments, the vertical guides 314 may be adjustable or movable relative to the frame 312, such that one or more dimensions, e.g., length and/or width dimensions, of the frame 312 and vertical guides 314 may be modified or adjusted to accommodate different associated dimensions of containers to be received therein. For example, the vertical guides 314 and brackets 313 may have sliding, rolling, telescoping, extendible, and/or retractable connections or couplings to each other and/or the frame 312 in order to enable adjustment of one or more dimensions of the vertical guides 314.

As shown in FIGS. 3A-3C, each vertical position within the lane of the magazine body 310 may include an associated sensor 316 and actuation mechanism 320. For example, the sensors 316 may comprise imaging sensors, scanning devices, photoeyes, proximity sensors, presence detection sensors, ranging sensors, radiofrequency identification (RFID) readers, or other types of sensors to detect and/or identify containers at respective vertical positions of the magazine body 310. In some examples, a sensor 316 may detect only a presence or absence of a container 305 at a particular vertical position. In other examples, a sensor 316 may detect and identify a container 305 at a particular vertical position, e.g., by capturing imaging data, scanning a barcode or other identifier, and/or reading an RFID tag.

The data captured by the sensors 316 may be used in various ways as further described herein. For example, the data may be used to receive additional containers within the magazine body 310, e.g., in response to determining that one or more vertical positions is unoccupied. In addition, the data may be used to move or index containers vertically downward within the magazine body 310, e.g., in response to determining that one or more vertical positions is unoccupied. Further, the data may be used to release one or more containers from the magazine body 310, e.g., in response to determining that a lowest position of a lane is occupied and in response to receiving associated requests for containers.

In other example embodiments, instead of having individual sensors 316 associated with each vertical position within a magazine body 310, only a subset of the vertical positions within a magazine body 310 may have associated sensors 316. For example, a lowest vertical position of the magazine body 310 may include a sensor 316 in order to reliably release a container from the magazine body 310 responsive to receiving a request. In addition, a highest vertical position of the magazine body 310 may include a sensor 316 in order to reliably request and receive additional containers into the magazine body 310. Various other numbers or combinations of sensors 316 associated with one or more vertical positions within a magazine body 310 may be used to reliably control receipt, movement, and release of containers via the magazine body 310.

In further example embodiments, instead of having individual sensors 316 associated with one or more vertical positions within a magazine body 310, one or more ranging or distance measurement sensors may be positioned at an upper portion of the magazine body 310 with a field of view that extends downward within the vertical lane, column, channel, or shaft of the magazine body 310. Such ranging or distance measurement sensors may detect a position of an uppermost container received within the magazine body 310, which may be used to reliably control receipt, movement, and release of containers via the magazine body 310 by ensuring that a sufficient number of containers, e.g., one or more containers, is stored and available within the magazine body.

In yet further example embodiments, instead of having individual sensors 316 associated with one or more vertical positions within a magazine body 310, one or more ranging or distance measurement sensors may be positioned at a lower portion of the magazine body 310 with a field of view that extends upward within the vertical lane, column, channel, or shaft of the magazine body 310. Such ranging or distance measurement sensors may detect a position of a lowermost container received within the magazine body 310, which may be used to reliably control receipt, movement, and release of containers via the magazine body 310 by ensuring that a container is always ready for release at the lowest vertical position of the magazine body.

In still further example embodiments, the magazine body 310 may not include any sensors 316 to detect and/or identify containers at one or more vertical positions within the magazine body 310. Instead, the actuation mechanisms 320, as further described herein, may be operated using an open-loop control method to control receipt, movement, and release of containers via the magazine body 310.

The actuation mechanisms 320 may be operated based on data received from one or more sensors 316. Further details of example actuation mechanisms are described herein at least with respect to FIGS. 4A-4B. For example, if a container is detected at a lowest position of the magazine body 310 and a request for a container is received, an actuation mechanism 320 associated with the lowest position may be actuated to release the container. In addition, if a container is not detected at a lowest position, or any other position, of the magazine body 310, one or more actuation mechanisms 320 associated with vertical positions above the empty or unoccupied position may be actuated to move or index containers downward within the magazine body 310.

In examples in which only a subset of vertical positions within a magazine body 310 may have associated sensors 316, and/or in examples in which actuation mechanisms 320 are operated using an open-loop control method without any sensors, upon release of a container from the magazine body 310, the actuation mechanisms within the magazine body may be substantially sequentially actuated to move or index containers within the magazine body, e.g., based on an assumption or understanding that generally every vertical position of the magazine body is occupied by a container.

In example embodiments, the actuation mechanisms 320 of the magazine body 310 may be operated substantially as a pull-based system. For example, in response to a request for a container from the magazine body 310, a container may be released from the lowest position of the magazine body 310. Then, upon release of the container from the lowest position, containers at vertical positions above the lowest position within the magazine body 310 may be sequentially moved or indexed downward, and another container may be received from an upstream station or process at a highest position of the magazine body 310. In this manner, all vertical positions within the magazine body 310 may generally remain occupied by respective containers as individual containers are sequentially released, or pulled, from the lowest position of the magazine body 310.

In other example embodiments, alternatively or in addition to receiving containers 305 via an upper portion of the magazine body 310, one or more containers 305 may be received by the magazine body 310 at various vertical positions of a magazine lane other than the upper portion. For example, one or more containers may be received substantially laterally at a particular vertical position of the magazine body 310, e.g., from a conveyance mechanism, pinch belt transport system, slide, chute, or other type of conveyance.

In order to receive containers at vertical positions other than an upper portion of the magazine body 310, at least one portion of the frame 312, brackets 313, and/or the vertical guides 314 may be adjustable or movable relative to each other, in order to open the vertical position to allow ingress or input of containers into the substantially vertical lane of the magazine body 310. For example, at least one portion of the frame 312, brackets 313, and/or the vertical guides 314 may have sliding, rolling, pivoting, rotating, telescoping, extendible, and/or retractable connections or couplings to each other in order to enable receipt of containers at such vertical positions of the magazine body 310. Further, one or more actuators, such as servos, solenoids, rotary motors, linear motors, pneumatic actuators, or other types of actuators, may be associated with the movable portions of the frame 312, brackets 313, and/or the vertical guides 314, in order to selectively allow and prevent receipt of containers at such vertical positions.

Although FIGS. 3A-3C illustrate a particular number, type, configuration, and arrangement of various components of a magazine body of an example automated container accumulation and delivery system, other example embodiments may include various other numbers, types, configurations, or arrangements of the various components. For example, the magazine body may have various other shapes, sizes, or configurations of a frame, vertical guides, and brackets, the magazine body may have various other numbers, types, and arrangements of sensors and/or actuation mechanisms, the magazine body may have various numbers of magazine lanes and/or various numbers of vertical positions within each magazine lane, and/or various other modifications or configurations are possible.

Figures 4A, 4B:
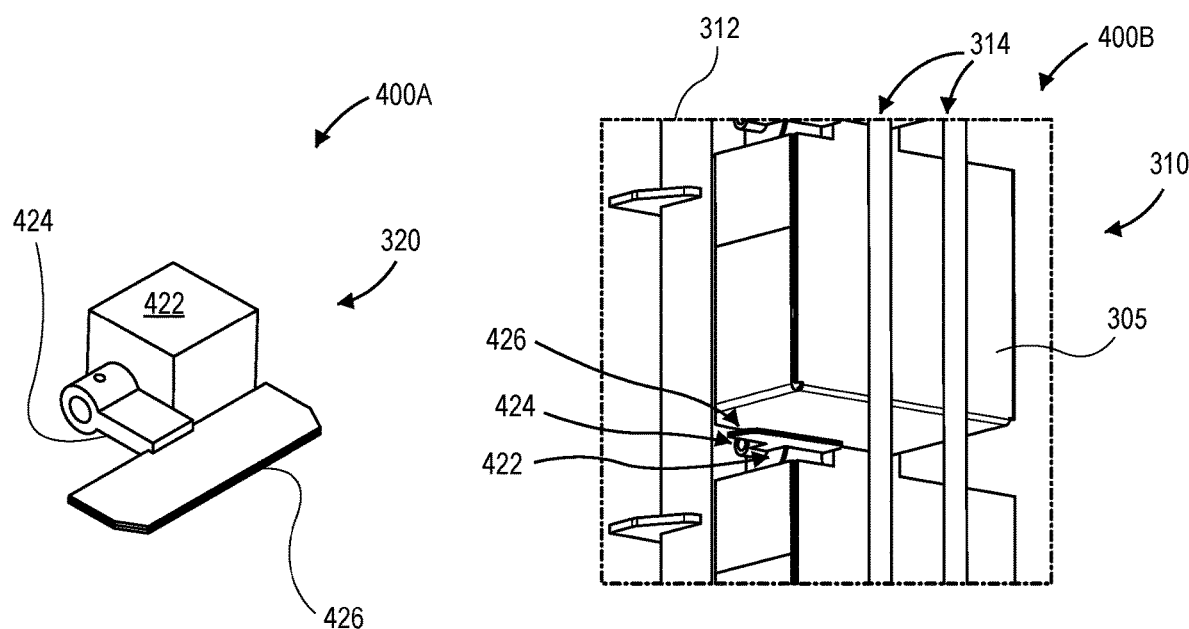
FIG. 4A is a schematic, perspective view diagram of an example actuation mechanism of a magazine lane of an automated container accumulation and delivery system, in accordance with implementations of the present disclosure.
FIG. 4B is a schematic, perspective view diagram of an example actuation mechanism positioned within a magazine lane of an automated container accumulation and delivery system, in accordance with implementations of the present disclosure.

FIG. 4A is a schematic, perspective view diagram 400A of an example actuation mechanism of a magazine lane of an automated container accumulation and delivery system, in accordance with implementations of the present disclosure. FIG. 4B is a schematic, perspective view diagram 400B of an example actuation mechanism positioned within a magazine lane of an automated container accumulation and delivery system, in accordance with implementations of the present disclosure.

As shown in FIGS. 4A-4B, the example automated container accumulation and delivery system may include a magazine body 310 comprising one or more actuation mechanisms 320. An example actuation mechanism 320 may comprise an actuator 422, a lever or arm 424, and a paddle, finger, or support surface 426. Various components described herein with respect to FIGS. 4A-4B may have any and all of the features of components having similar reference numerals described herein with respect to any other Figures.

The actuator 422 may comprise various types of motors or actuators, such as servo motors, solenoids, rotary actuators, linear actuators, pneumatic actuators, or other types of actuators. In addition, the actuator 422 may be coupled or attached to the lever 424 in order to move or rotate the lever 424 between at least two positions. Further, the lever 424 may be coupled, attached, or formed together with the paddle 426, such that movement of the lever 424 by the actuator 422 causes corresponding movement of the paddle 426 between at least two positions. The lever 424 and paddle 426 may be formed of various materials, such as metals, plastics, composites, other materials, or combinations thereof. In addition, the lever 424 and paddle 426 may be coupled or joined to each other, as well as to the actuator 422, by various methods, such as welds, adhesives, fasteners, rivets, or other types of attachment methods.

The at least two positions of the lever 424 and paddle 426 may include a container hold or support position and a container release position. For example, in the container hold or support position, the paddle 426 may support a base or other portion of a container to maintain the container at a particular vertical position within a magazine body. In the container release position, the paddle 426 may move or rotate downward or away from a base or other portion of a container to allow the container to move or index downward to a next lower vertical position within a magazine body.

FIG. 4B illustrates an example actuation mechanism 320 positioned within a magazine body 310 having a frame 312 and vertical guides 314, in which a container 305 is held within the vertical position of the magazine body 310 by the frame 312, vertical guides 314, and actuation mechanism 320. The actuation mechanism 320 may be coupled, adhered, or associated with a portion of the frame 312, and the actuation mechanism 320 may define or be associated with a particular vertical position within the magazine body 310.

As shown in FIG. 4B, the lever 424 and paddle 426 may be positioned in a container hold or support position, in order to support a portion of a base of the container 305 and maintain the container 305 at the vertical position within the magazine body 310. Upon actuation by the actuator 422, the lever 424 and paddle 426 may move or rotate downward or away from the base of the container 305 toward a container release position, such that the container may move downward within the magazine body 310 to a next lower vertical position and associated actuation mechanism.

In some example embodiments, each vertical position of a magazine body 310 may include an associated actuation mechanism 320, and each actuation mechanism 320 may be independently controlled or actuated to support or release a container at a respective vertical position. For example, an actuation mechanism associated with a lowest vertical position within a magazine body 310 may be actuated to release a container, then an actuation mechanism associated with a next higher vertical position within the magazine body 310 may be actuated to move or index a container down to the lowest vertical position, then an actuation mechanism associated with a next higher vertical position within the magazine body 310 may be actuated to move or index a container down to the next lower vertical position, etc.

In other example embodiments, actuation or operation of one or more actuation mechanisms may be ganged, chained, or otherwise coupled or combined. In some examples, multiple actuation mechanisms may be physically chained, belted, connected, or ganged together such that they are all actuated together, e.g., simultaneously, concurrently, or sequentially. For example, an actuation mechanism associated with a lowest (or other) vertical position within a magazine body 310 may be actuated to release a container, and as a result of a physical coupling or connection, an actuation mechanism associated with a next higher vertical position within the magazine body 310 may also be actuated to move or index a container down to the lowest (or next lower) vertical position, and further as a result of a physical coupling or connection, an actuation mechanism associated with a next higher vertical position within the magazine body 310 may be actuated to move or index a container down to the next lower vertical position, etc. In such examples, a single actuator may be used to actuate or drive multiple actuation mechanisms that are physically chained, belted, connected, or ganged together.

In other examples, multiple actuation mechanisms may be operatively or electrically coupled, combined, connected, or ganged together such that they are all actuated together, e.g., simultaneously, concurrently, or sequentially, via software or electronic control. For example, an actuation mechanism associated with a lowest (or other) vertical position within a magazine body 310 may be actuated to release a container, and after a defined time delay and/or based on data from one or more sensors, an actuation mechanism associated with a next higher vertical position within the magazine body 310 may also be actuated to move or index a container down to the lowest (or next lower) vertical position, and after a further defined time delay and/or based on data from one or more sensors, an actuation mechanism associated with a next higher vertical position within the magazine body 310 may be actuated to move or index a container down to the next lower vertical position, etc.

In further example embodiments, the actuation mechanisms may comprise structures similar to a vertical carousel or vertical lift system. In such examples, the vertical carousel may comprise a plurality of moving vertical positions, shelves, platforms, or other structures, and a single actuator may drive or actuate the vertical carousel. Then, containers received within the vertical positions or shelves of the vertical carousel may be released from a lower portion of the carousel as the actuator rotates the carousel. Because the vertical carousel comprises a moving structure having a plurality of moving vertical positions, shelves, platforms, or other structures, all other containers received at other vertical positions of the carousel may move or index simultaneously during movement and release of a container from the lower portion of the carousel.

Although FIGS. 4A-4B illustrate a particular number, type, configuration, and arrangement of various components of an actuation mechanism of an example automated container accumulation and delivery system, other example embodiments may include various other numbers, types, configurations, or arrangements of the various components. For example, the actuation mechanism may have various other numbers, shapes, sizes, or configurations of an actuator, lever, and paddle. In addition, the actuation mechanism may comprise linear actuation mechanisms, e.g., including a solenoid and extendible/retractable paddle or arm, and/or including a pneumatic cylinder and extendible/retractable paddle or arm. Various other modifications or configurations of different actuation mechanisms are possible in order to selectively hold or support containers at, as well as release containers from, respective vertical positions of a magazine body.

Figures 5A, 5B:
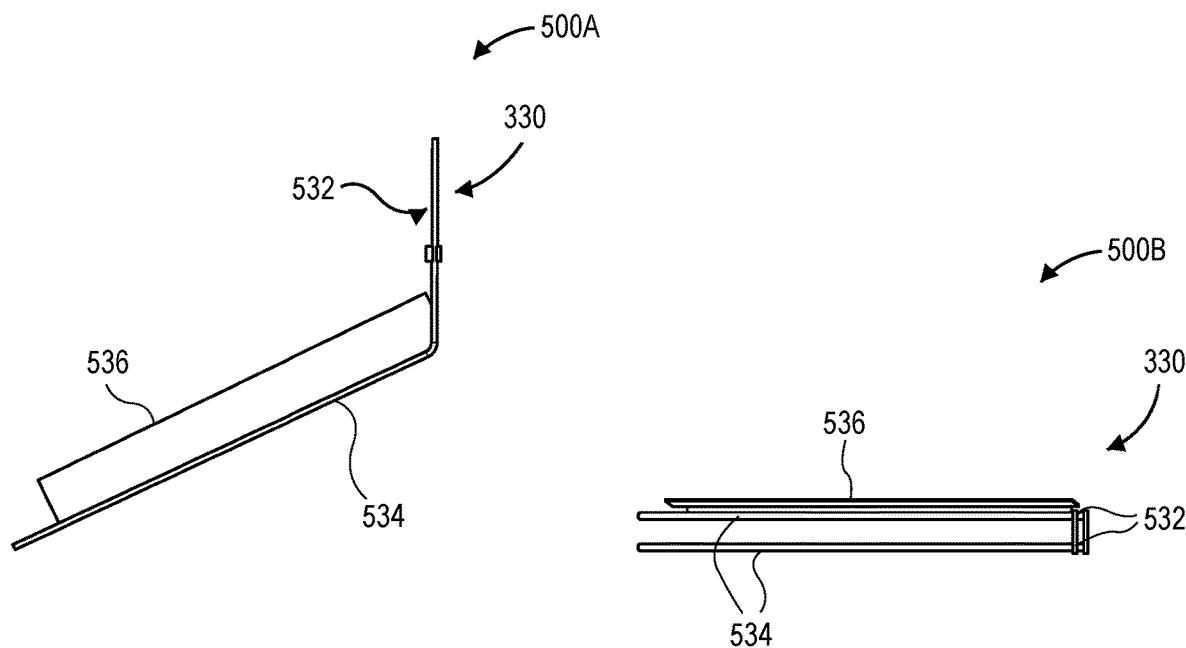
FIG. 5A is a schematic, front view diagram of an example slide of an automated container accumulation and delivery system, in accordance with implementations of the present disclosure.
FIG. 5B is a schematic, top view diagram of an example slide of an automated container accumulation and delivery system, in accordance with implementations of the present disclosure.
Figure 5C:
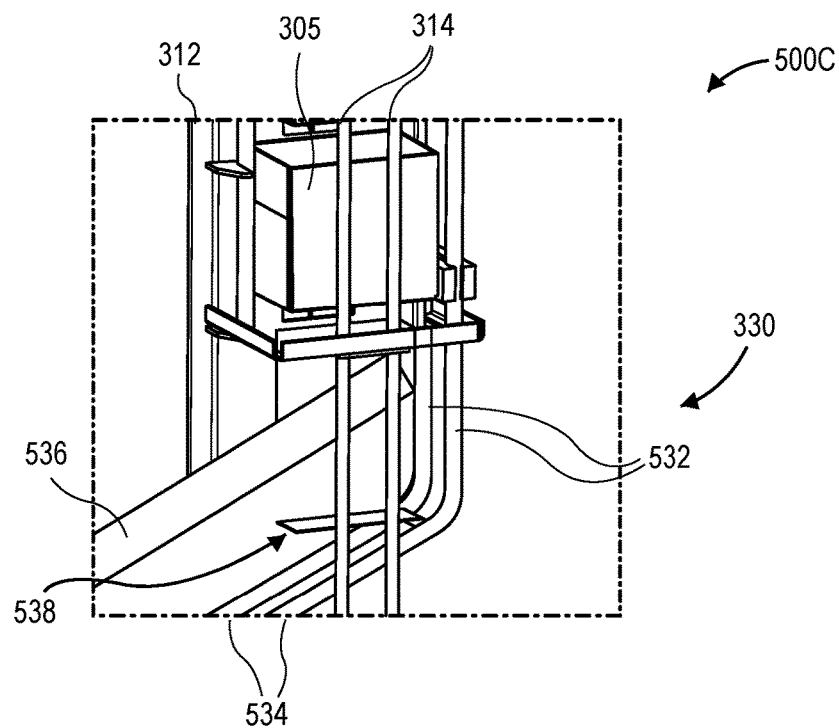
FIG. 5C is a schematic, perspective view diagram of a portion of an example slide of an automated container accumulation and delivery system, in accordance with implementations of the present disclosure.

FIG. 5A is a schematic, front view diagram 500A of an example slide of an automated container accumulation and delivery system, in accordance with implementations of the present disclosure. FIG. 5B is a schematic, top view diagram 500B of an example slide of an automated container accumulation and delivery system, in accordance with implementations of the present disclosure. FIG. 5C is a schematic, perspective view diagram 500C of a portion of an example slide of an automated container accumulation and delivery system, in accordance with implementations of the present disclosure.

As shown in FIGS. 5A-5C, the example automated container accumulation and delivery system may include a slide 330 comprising one or more couplings 532, one or more base surfaces 534, and one or more side surfaces 536. In addition, as shown at least with respect to FIGS. 1, 2, and 6, a lower or end portion of the base surfaces 534 may be coupled or attached to a portion of a workstation or work surface. Various components described herein with respect to FIGS. 5A-5C may have any and all of the features of components having similar reference numerals described herein with respect to any other Figures.

The couplings 532 of the slide 330 may attach or couple the slide 330 to a portion of the magazine body 310, e.g., a portion of the frame 312, brackets 313, and/or vertical guides 314. For example, the couplings 532 may comprise bars, poles, rods, beams, plates, or other structures that can engage or couple with a portion of the magazine body 310, e.g., via corresponding holes, orifices, beams, plates, or other structures. The couplings 532 may be formed of various materials, such as metals, plastics, composites, other materials, or combinations thereof.

In some example embodiments, the couplings 532 may comprise a movable or slidable connection between the slide 330 and the magazine body 310. For example, the couplings 532 may enable vertical movement or translation of the slide 330 relative to the magazine body 310. In addition, because a lower or end portion of the slide 330 may be coupled or attached with a portion of an adjustable work surface, vertical adjustment of the work surface may cause corresponding vertical adjustment of the slide 330 relative to the magazine body 310. Further, the vertical adjustment of the slide 330 relative to the magazine body 310 may maintain controlled guidance, sliding, and movement of containers along the slide 330 from the magazine body 310 to the work surface.

In other example embodiments, the couplings 532 may comprise a rotatable or pivotable connection between the slide 330 and the magazine body 310. For example, the couplings 532 may enable rotation or pivoting of the slide 330 relative to the magazine body 310. In addition, because a lower or end portion of the slide 330 may be coupled or attached with a portion of an adjustable work surface, e.g., via another rotatable or pivotable connection, vertical adjustment of the work surface may cause corresponding rotation or pivoting of the slide relative to both the work surface and the magazine body 310. Further, the rotating or pivoting adjustment of the slide 330 relative to the work surface and the magazine body 310 may maintain controlled guidance, sliding, and movement of containers along the slide 330 from the magazine body 310 to the work surface.

In further example embodiments, alternatively or in addition to vertical translation or pivoting of the slide 330 relative to the magazine body 310 in response to adjustment of the work surface, the vertical position and/or angle of inclination of the slide 330 may also be user adjustable, e.g., by manual manipulation and/or by actuation of one or more actuators that adjust the vertical position and/or angle of inclination. In this manner, a user, or other facility personnel, may adjust the vertical position and/or angle of inclination of the slide 330 both for ergonomic operations by a user and also for improved or optimized sliding and delivery of containers to the work surface. For example, if a magazine body initially accumulates and delivers containers having first friction characteristics, such as cardboard boxes or lighter, smaller containers, and then the magazine body subsequently accumulates and delivers containers having second friction characteristics, such as plastic totes or heavier, larger containers, the vertical position and/or angle of inclination may be adjusted or modified to provide improved or optimal sliding characteristics for the different types of containers based on their respective friction characteristics in combination with materials and friction characteristics of the slide 330.

The base surfaces 534 of the slide 330 may extend from the couplings 532 to a lower or end portion of the slide 330. For example, the base surfaces 534 may comprise bars, poles, rods, beams, plates, surfaces, belts, rollers, wheels, balls, or other structures that can receive and guide containers from a magazine body to a work surface. The base surfaces 534 may be formed of various materials, such as metals, plastics, composites, other materials, or combinations thereof.

In some example embodiments, the base surfaces 534 may comprise passive surfaces. For example, the base surfaces 534 may comprise bars, poles, rods, beams, plates, surfaces, rollers, wheels, balls, or other passive structures that may enable containers to move or slide in a controlled manner from a magazine body to a work surface. In the example of FIGS. 5A-5C, the base surfaces comprise two substantially parallel poles or bars along which bases of containers may slide or move. Other example embodiments may include other numbers, types, shapes, sizes, or arrangements of different passive structures that may contact and support various surfaces, edges, and/or corners of containers to enable sliding or movement.

In other example embodiments, the base surfaces 534 may comprise active surfaces. For example, the base surfaces 534 may comprise plates, surfaces, conveyors, belts, rollers, wheels, balls, or other active structures that may be actuated to move or transfer containers along the slide in a controlled manner from a magazine body to a work surface. Various types or combinations of active structures may be used to cause movement of containers.

The base surfaces 534 may have a particular shape, size, angle, or other characteristics to enable sliding or movement of containers along the slide 330. For example, an angle of inclination of the base surfaces 534 relative to horizontal or ground may be selected based on friction coefficients of materials of containers and materials or characteristics of the base surfaces 534, in order to enable controlled movement or sliding of containers. The angle of inclination may be approximately 25 degrees relative to horizontal, approximately 35 degrees relative to horizontal, or other angles. As described herein, the angle of inclination may also be user adjustable, in order to provide improved ergonomics as well as to ensure reliable sliding and guidance of containers along the slide 330.

In addition, the base surfaces 534 may have a single, constant angle of inclination, or the base surfaces 534 may have different sections having various different angles of inclination to control portions of movement or sliding of containers. For example, a first portion of the base surfaces 534 closer to the magazine body may have a steeper angle of inclination to initiate sliding of a container, e.g., to accelerate the container, and a second portion of the base surfaces 534 closer to the work surface may have a flatter angle of inclination to reduce sliding of the container, e.g., to decelerate the container. Various other combinations of angles of inclination or other shape, size, or surface features may be adjusted or modified to control the sliding or movement of containers along the slide 330.

In other example embodiments, the angle of inclination may be close to or substantially zero or flat relative to ground, and the slide 330 may comprise an active surface such as a conveyor belt or rollers, such that containers are released onto a substantially flat surface and then transferred to the work surface via the conveyor belt or rollers.

The side surfaces 536 of the slide 330 may also extend from the couplings 532 to a lower or end portion of the slide 330. For example, the side surfaces 536 may comprise bars, poles, rods, beams, plates, surfaces, or other structures that can guide and maintain containers on the base surfaces 534 of the slide 330 from a magazine body to a work surface. The side surfaces 536 may be formed of various materials, such as metals, plastics, composites, other materials, or combinations thereof.

The side surfaces 536 may generally ensure that containers do not fall or tumble off the slide 330 before reaching the work surface. In some example embodiments, the base surfaces 534 may be angled slightly toward the side surfaces 536, and the side surfaces 536 may also be angled in corresponding manner, such that the base surfaces 534 and side surfaces 536 may form an at least partially V-shaped structure in cross-section, and thereby tend to maintain containers on the base surfaces 534 slightly biased toward the side surfaces 536, under force of gravity.

In further example embodiments, a stop bar, plate, platform, surface, or other structure may be coupled to a lower or end portion of the base surfaces 534 of the slide 330. The stop bar or plate may cause one or more containers on the slide 330 to stop and be held at the lower or end portion, e.g., without moving or sliding directly onto a workstation or work surface. In some examples, the slide 330 may not be coupled or adjacent to a workstation or work surface, such that the stop bar or plate may prevent containers from falling off the end of the slide 330. In other examples, it may be beneficial to hold or maintain one or more containers proximate the lower or end portion of the slide 330 until such time as an associate is ready to utilize a container that is held ready by the stop bar or plate at the lower or end portion of the slide 330.

As shown in FIG. 5C, in some example embodiments, the slide 330 may also include a damper mechanism 538. The damper mechanism 538 may reduce or dissipate a speed, energy, or momentum associated with a container that is released from the magazine body 310, in order to more reliably control the movement or sliding of the container along the slide 330 toward a work surface. Although shown in FIG. 5C as being associated with the base surfaces 534 of the slide 330, in other example embodiments, a damper mechanism may be associated with the couplings 532 or side surfaces 536 of the slide, with portions of the magazine body, e.g., the frame, brackets, or vertical guides, and/or with portions of the actuation mechanisms at the lowest vertical positions of the magazine body.

In example embodiments, the damper mechanism may comprise various components or structures to reduce or dissipate energy or momentum associated with a container, such as rotary dampers, linear dampers, viscous dampers, friction dampers, springs, or various other types of damping mechanisms. In the example illustrated in FIG. 5C, the damper mechanism 538 may comprise a spring-loaded damper plate that rotates around a pivot point, and against a spring force of a spring, e.g., a torsion spring or other type of spring. The damper mechanism 538 may thus receive a container in the position illustrated in FIG. 5C, and then reduce or dissipate energy or momentum of the container while rotating or pivoting downward to allow the container to move or slide down the base surfaces 534 of the slide 330.

In some example embodiments of a magazine body having a plurality of magazine lanes, a plurality of damper mechanisms may be provided along portions of the slide and associated with individual magazine lanes. In some examples, one or more individual damper mechanisms may be selectively extendible or retractable dependent upon the particular magazine lane from which a container is to be released. Thus, only a damper mechanism associated with a magazine lane from which a container is released may be selectively extended for operation, while other damper mechanisms associated with other magazine lanes may be selective retracted to prevent unnecessary or excessive damping and slowing of the movement of the container down the slide.

In other example embodiments, individual damper mechanisms may be provided along portions of the individual magazine lanes themselves, such that containers released from each magazine lane may be damped or slowed by respective damper mechanisms. In addition, there may not be a need to selectively extend or retract such damper mechanisms provided along portions of the individual magazine lanes because released containers from various magazine lanes may not contact damper mechanisms associated with other magazine lanes upon release to the slide.

In further example embodiments, one or more damper mechanisms may be provided along various portions of the slide, e.g., the base surfaces and/or the side surfaces, in order to dampen or slow movement of substantially all containers released from the magazine body and guided by the slide.

In additional example embodiments, one or more sensors may be positioned at or proximate one or more portions of the slide 330. For example, the sensors may comprise imaging sensors, scanning devices, photoeyes, proximity sensors, presence detection sensors, ranging sensors, radiofrequency identification (RFID) readers, or other types of sensors to detect and/or identify containers at respective positions along the slide 330. In some examples, a sensor may detect only a presence or absence of a container at a particular portion of the slide. In other examples, a sensor may detect and identify a container at a particular portion of the slide, e.g., by capturing imaging data, scanning a barcode or other identifier, and/or reading an RFID tag.

The data captured by the sensors may be used in various ways as further described herein. For example, the data may be used to receive additional containers within the magazine body 310, e.g., in response to detecting and/or identifying one or more released containers. In addition, the data may be used to move or index containers vertically downward within the magazine body 310, e.g., in response to detecting and/or identifying one or more released containers. Further, the data may be used to release one or more containers from the magazine body 310, e.g., in response to failing to detect and/or identify any released containers. Various numbers or combinations of sensors associated with one or more portions of a slide may be used to reliably control receipt, movement, and release of containers via the magazine body 310.

In still further example embodiments, the slide 330 may not include any sensors to detect and/or identify containers at one or more portions of the slide. Instead, one or more sensors associated with the magazine body and/or a work surface may be used to reliably control receipt, movement, and release of containers via the magazine body 310. Alternatively, as further described herein, the automated container accumulation and delivery system may not include any sensors, and may substantially operate using an open-loop control method to control receipt, movement, and release of containers from the magazine body to the work surface via the slide.

In additional example embodiments, one or more auxiliary processing devices, such as printers, label applicators, or similar types of devices, may also be positioned adjacent or proximate various portions of the slide 330, various portions of the magazine lanes of the magazine body 310, and/or various portions of a work surface. Such auxiliary processing devices may print information directly onto containers, may print and apply labels onto containers at various portions of the container accumulation and delivery system, and/or may perform various other auxiliary functions or operations with respect to containers.

Although FIGS. 5A-5C illustrate a particular number, type, configuration, and arrangement of various components of a slide of an example automated container accumulation and delivery system, other example embodiments may include various other numbers, types, configurations, or arrangements of the various components. For example, the slide may have various other numbers, shapes, sizes, angles, curvatures, or configurations of couplings, base surfaces, and side surfaces, the couplings may have various combinations of pivotable, rotatable, or translatable connections or attachments, the base surfaces and/or side surfaces may have various combinations of active and/or passive surfaces, the slide may include various combinations of damper mechanisms at various portions of the slide, and/or the slide may include various combinations of sensors and/or auxiliary devices along various portions of the slide. Various other modifications or configurations of different slides are possible in order to enable movement or sliding of containers released from a magazine body toward a work surface.

Figure 6:
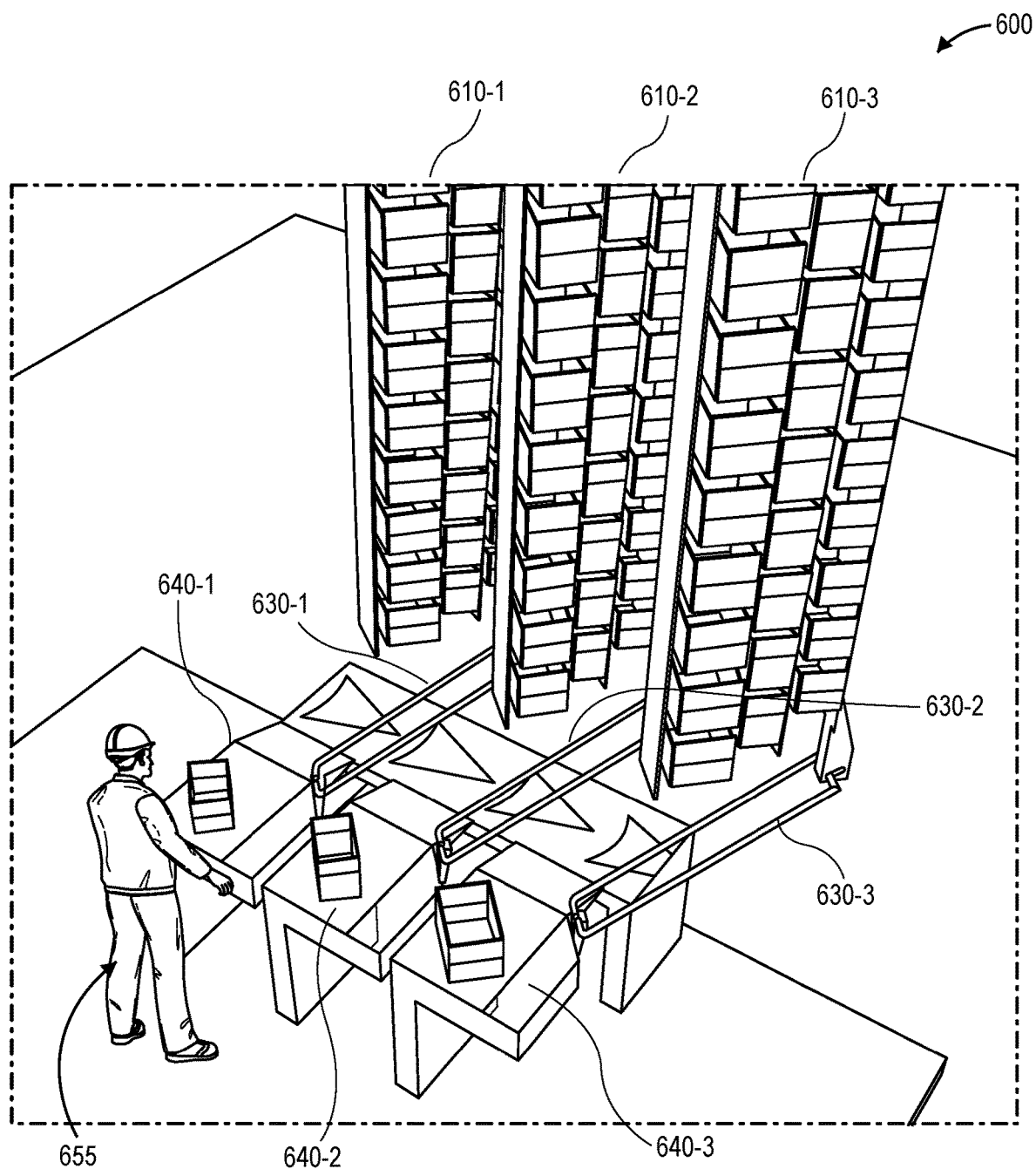
FIG. 6 is a schematic, perspective view diagram of an example processing station having multiple automated container accumulation and delivery systems, in accordance with implementations of the present disclosure.

FIG. 6 is a schematic, perspective view diagram 600 of an example processing station having multiple automated container accumulation and delivery systems, in accordance with implementations of the present disclosure.

As shown in FIG. 6, the example processing station may include a plurality of automated container accumulation and delivery systems including respective magazine bodies 610, respective slides 630, and respective workstations or work surfaces 640. For example, the processing station may include three magazine bodies 610-1, 610-2, 610-3 having associated magazine lanes, three slides 630-1, 630-2, 630-3, and three workstations or work surfaces 640-1, 640-2, 640-3. In addition, an associate 655, or other robotic or automated machinery or equipment, may process items and/or containers at one or more of the work surfaces 640. Various components described herein with respect to FIG. 6 may have any and all of the features of components having similar reference numerals described herein with respect to any other Figures.

As described herein, the magazine bodies 610 may receive containers of various sizes, shapes, or dimensions from upstream stations or processes. Each magazine body 610 may have one or more vertical lanes, columns, channels, or shafts having a plurality of vertical positions that are configured to receive containers, and each magazine body 610 may have one or more sensors and/or actuators to detect, identify, move, and/or index containers from an upper portion to a lower portion of the magazine lanes.

Upon release of a container from a magazine lane of a magazine body 610, a respective slide 630 may receive and guide the container from the magazine lane to a respective work surface 640. Each slide 630 may have one or more passive and/or active surfaces and/or one or more damper mechanisms to guide the container to the work surface 640, and each slide 630 may also have one or more sensors to detect and/or identify containers that are released to the work surface 640.

Each of the work surfaces 640 may receive containers from respective slides 630 and respective magazine lanes of magazine bodies 610. As described herein, one or more of the work surfaces 640 may include respective stops, such as bars, posts, beams, edges, bumps, protrusions, or other features, to positively stop movement of containers that are received on the work surfaces 640 from respective slides 630. In addition, one or more of the work surfaces 640 may include flat or static surfaces to receive containers, or may include passive and/or active components such as rollers, wheels, balls, conveyors, belts, or other components to facilitate movement or sliding of containers onto and relative to work surfaces 640. One or more associates 655, robotic arms, or other automated machinery or equipment may process the containers that are received on the work surfaces 640.

In some examples, one or more items may be placed or packed into containers, and the containers may then be transferred to one or more downstream stations or processes, e.g., via conveyors, slides, chutes, robotic devices, autonomous vehicles, or other conveyance mechanisms. In other examples, one or more items may be removed or picked from containers, and the items and containers may then be transferred to one or more downstream stations or processes, e.g., via conveyors, slides, chutes, robotic devices, autonomous vehicles, or other conveyance mechanisms. Various other example processes or operations may be performed with respect to containers received on the work surfaces 640.

As described herein, the work surfaces 640 may be movably or pivotably coupled or attached to respective slides 630 and/or respective magazine bodies 610. For example, a work surface 640 may include vertical height adjustment to improve ergonomics for associates. In some examples, a respective slide 630 may be coupled to the work surface 640 and move vertically in response to height adjustment of the work surface 640, and the slide 630 may move vertically relative to a substantially static or fixed magazine body 610. In this manner, an angle of inclination of the slide 630 may be maintained substantially constant while allowing vertical height adjustment of the work surface 640 and slide 630 relative to the magazine body 610.

In other examples, a respective slide 630 may be pivotably or rotatably coupled to the work surface 640 and move or rotate in response to height adjustment of the work surface 640, and the slide 630 may also move or rotate relative to a substantially static or fixed magazine body 610. In this manner, an angle of inclination of the slide 630 may be minimally adjusted while allowing vertical height adjustment of the work surface 640 and slide 630 relative to the magazine body 610. Various other combinations of sliding, translating, pivotable, or rotatable connections or couplings between the work surface 640, slide 630, and magazine body 610 are possible to facilitate ergonomic height adjustment of the work surface 640 while still maintaining controlled release, sliding, and guidance of containers along the slide from the magazine body 610 to the work surface 640.

In additional example embodiments, one or more sensors may be positioned at or proximate one or more portions of workstations or work surfaces. For example, the sensors may comprise imaging sensors, scanning devices, photo-eyes, proximity sensors, presence detection sensors, ranging sensors, radiofrequency identification (RFID) readers, or other types of sensors to detect and/or identify containers at respective portions of workstations or work surfaces. In some examples, a sensor may detect only a presence or absence of a container at a particular work surface. In other examples, a sensor may detect and identify a container at a particular work surface, e.g., by capturing imaging data, scanning a barcode or other identifier, and/or reading an RFID tag.

The data captured by the sensors may be used in various ways as further described herein. For example, the data may be used to receive additional containers within the magazine body 610, e.g., in response to detecting and/or identifying one or more released containers. In addition, the data may be used to move or index containers vertically downward within the magazine body 610, e.g., in response to detecting and/or identifying one or more released containers. Further, the data may be used to release one or more containers from the magazine body 610, e.g., in response to failing to detect and/or identify any released containers. Various numbers or combinations of sensors associated with one or more portions of workstations or work surfaces may be used to reliably control receipt, movement, and release of containers via the magazine body 610.

In still further example embodiments, the workstations or work surfaces may not include any sensors to detect and/or identify containers at one or more portions of workstations or work surfaces. Instead, one or more sensors associated with the magazine body and/or the slide may be used to reliably control receipt, movement, and release of containers via the magazine body. Alternatively, as further described herein, the automated container accumulation and delivery system may not include any sensors, and may substantially operate using an open-loop control method to control receipt, movement, and release of containers from the magazine body to the work surface via the slide.

In additional example embodiments, one or more auxiliary processing devices, such as printers, label applicators, or similar types of devices, may also be positioned adjacent or proximate various portions of the slide, various portions of the magazine lanes of the magazine body, and/or various portions of workstations or work surfaces. Such auxiliary processing devices may print information directly onto containers, may print and apply labels onto containers at various portions of the container accumulation and delivery system, and/or may perform various other auxiliary functions or operations with respect to containers.

Although FIG. 6 illustrates a particular number, type, configuration, and arrangement of various components of an example processing station having multiple automated container accumulation and delivery systems, other example embodiments may include various other numbers, types, configurations, or arrangements of the various components. For example, the processing station may have various numbers, types, or arrangements of magazine bodies, slides, and work surfaces, the magazine bodies may have various numbers of magazine lanes, the magazine lanes may receive various numbers, sizes, shapes, or dimension of containers, the slides may have various other shapes, sizes, angles, or configurations to guide containers, the work surfaces may have various other shapes, sizes, or configurations to receive containers, various other numbers, types, and arrangements of sensors, actuators, auxiliary devices, or other components may be included, and/or various other modifications or configurations are possible.

Figure 7:
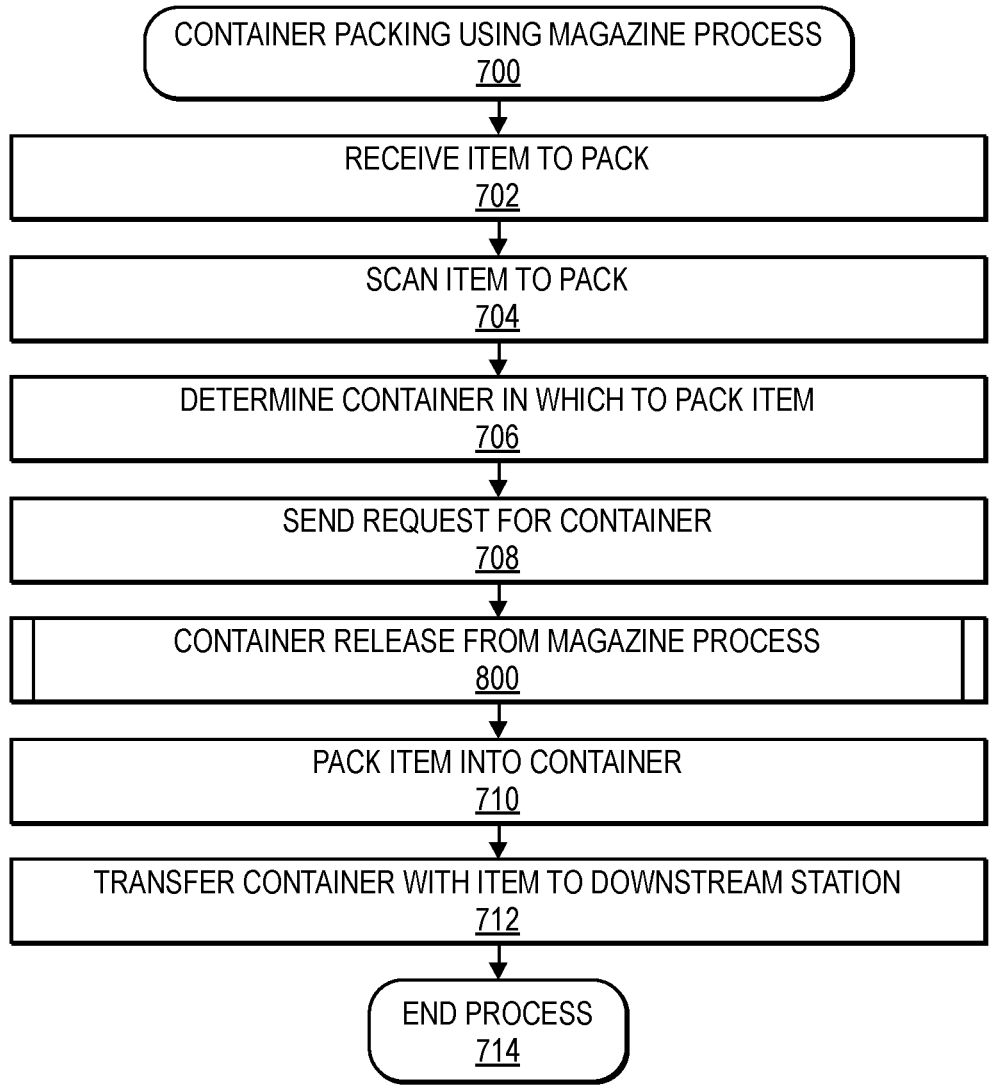
FIG. 7 is a flow diagram illustrating an example container packing using magazine process, in accordance with implementations of the present disclosure.

FIG. 7 is a flow diagram illustrating an example container packing using magazine process 700, in accordance with implementations of the present disclosure.

The process 700 may begin by receiving an item to pack, as at 702. For example, an inbound conveyance mechanism may transfer or transport one or more items to be packed to a processing station, e.g., a packing station. Various types of items may be packed into one or more containers at the processing station. Further, a controller may instruct transfer of one or more items to a processing station.

The process 700 may continue by scanning an item to pack, as at 704. For example, an associate, robotic arm, or other automated machinery or equipment at the processing station may scan or capture a barcode, QR code, or other identifier associated with one or more items to be packed. Various types of scanning devices, imaging devices, RFID readers, or other types of sensors may be used to detect and/or identify the items to pack. In addition, the items may be associated with one or more orders, groups of items, or other requests for items by one or more downstream stations or processes and/or customers. Further, a controller may instruct scanning or capture of identifiers associated with items to pack, and receive the scanned or captured identifiers.

The process 700 may proceed by determining a container in which to pack an item, as at 706. For example, based on the scanned or captured identifiers of items to pack, one or more containers may be selected or determined to pack the items. In some examples, the containers may be selected or chosen based on data associated with the items based on the scanned identifiers, such as type, size, shape, dimensions, fragility, or other characteristics or aspects of the items. In other examples, an associate may select or determine one or more containers to pack the items, e.g., using an input element, touchscreen, or other input device. Further, a controller may receive or determine containers in which to pack items.

The process 700 may continue to send a request for a container, as at 708. For example, one or more containers may be requested from one or more container accumulation and delivery systems associated with the processing station as described herein. As described herein, the containers may be selected and requested based on scanned or captured identifiers of items to pack, and/or the containers may be selected and requested based on associate input. In additional examples, one or more sensors, imaging devices, light curtains, proximity sensors, or other types of sensors may detect or determine when a work surface is empty or ready to receive a container as part of the determination to send a request for a container. For example, whenever a work surface is empty and/or ready to receive a container, a container may be released to the work surface such that the container is already delivered and ready for an associate when needed. In addition, to ensure safety of associates, one or more light curtains, proximity sensors, or other sensors associated with or around the work surface may be checked for absence of items, containers, hands, arms, or other objects before releasing a next container for use at the work surface. Further, a controller may send instructions to one or more container accumulation and delivery systems to release the requested containers.

The process 700 may proceed to the container release from magazine process, as at 800. For example, the requested containers may be released from one or more magazine lanes of magazine bodies of a container accumulation and delivery system. Then, the released containers may be transferred via one or more slides to one or more work surfaces of the processing station to enable operations by an associate, robotic arm, or other automated machinery or equipment. Further, a controller may instruct the container release from magazine process. Further details of the container release from magazine process are described herein at least with respect to FIG. 8.

The process 700 may continue with packing an item into a container, as at 710. For example, upon receiving requested containers at work surfaces, an associate, robotic arm, or other automated machinery or equipment at the processing station may pack one or more items into the containers. As described herein, various other operations or processes are possible with respect to items and/or containers. Further, a controller may instruct packing of items into containers.

The process 700 may proceed with transferring the container with the item to a downstream station, as at 712. For example, upon completion of packing one or more items into containers, the containers may be transferred or moved to one or more downstream stations or processes via an outbound conveyance mechanism. In some examples, the downstream stations or processes may comprise sortation, storage, shipping, transport, or various other types of operations. In additional examples, one or more sensors, imaging devices, light curtains, proximity sensors, or other types of sensors may detect or determine when an associate is performing operations with respect to a work surface and a container. Responsive to detecting that the associate has completed operations with respect to the container, e.g., detecting placement of items into the container and/or detecting removal of arms or hands from the work surface, one or more active components associated with the work surface may automatically transfer the container to a downstream station. In addition, to ensure safety of associates, one or more light curtains, proximity sensors, or other sensors associated with or around the work surface may be checked for absence of hands, arms, or other objects before transferring the container away from the work surface. Further, a controller may instruct transfer of containers to downstream stations.

The process 700 may then end, as at 714.

Figure 8:
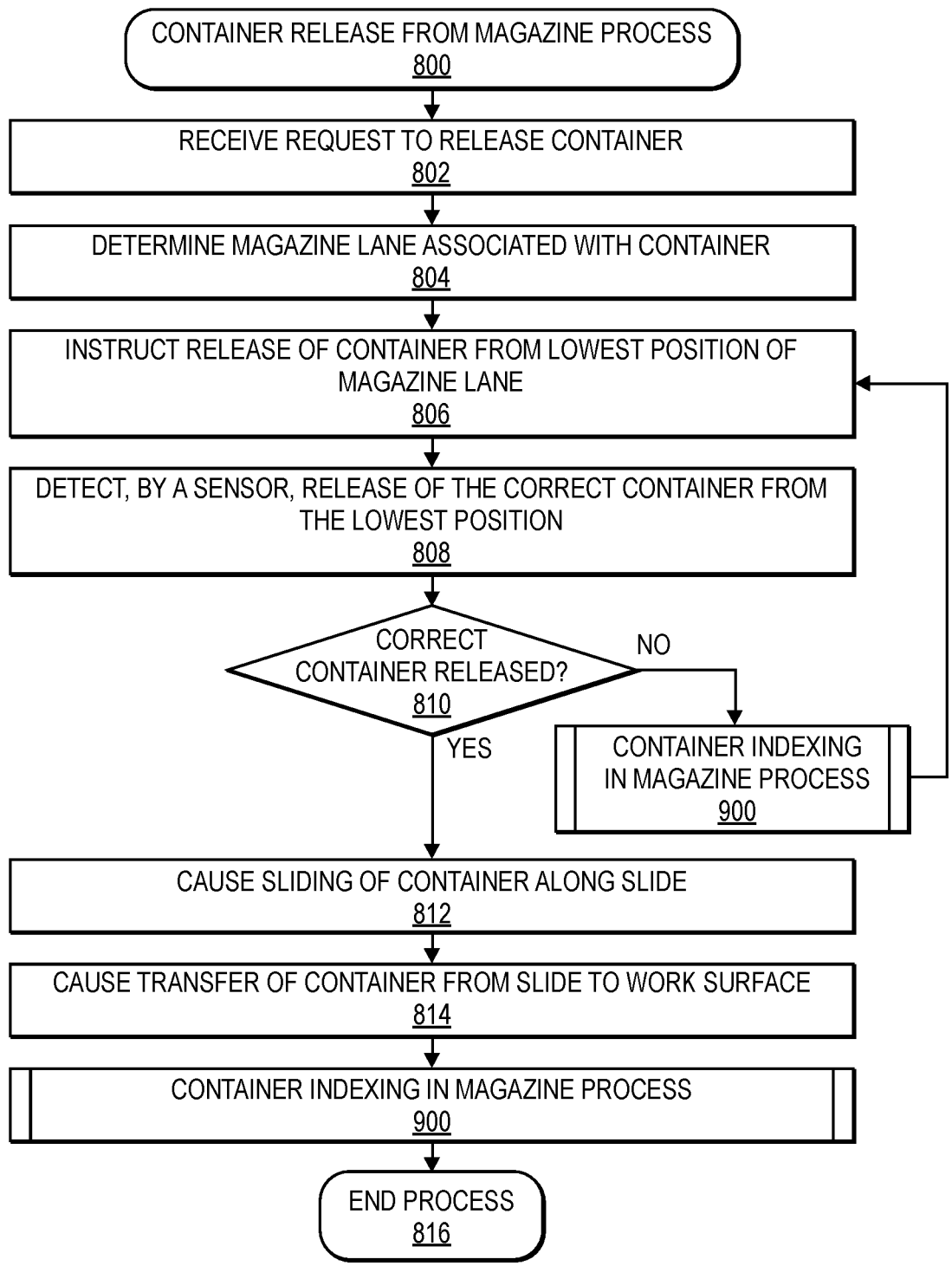
FIG. 8 is a flow diagram illustrating an example container release from magazine process, in accordance with implementations of the present disclosure.

FIG. 8 is a flow diagram illustrating an example container release from magazine process 800, in accordance with implementations of the present disclosure.

The process 800 may begin with receiving a request to release a container, as at 802. For example, a request for a container may be received based on one or more items to be packed at a processing station, based on an operational state or readiness of a work surface to receive a container, and/or based on associate input. The request may comprise an instruction to release a container having particular type, size, shape, dimensions, or other characteristics to be used at the processing station. Further, a controller may receive the request to release a container.

The process 800 may continue by determining a magazine lane associated with the container, as at 804. For example, based on the received request for a container, a particular magazine lane of a respective magazine body may be identified or selected that has received and stored containers having the requested type, size, shape, dimensions, or other characteristics. In examples in which a specific requested container may not be available in any magazine lanes of magazine bodies, a particular magazine lane of a respective magazine body may be identified or selected that has received and stored containers having characteristics that may be sufficient to receive the items to be packed within the container, e.g., a container that has slightly larger dimensions than those of a requested container. Further, a controller may determine a magazine lane from which to release a requested container.

The process 800 may proceed by instructing release of the container from the lowest position of the magazine lane, as at 806. For example, upon identifying or selecting the magazine lane having containers of the requested type, a container from a lowest position of the selected magazine lane may be released. An actuation mechanism associated with the lowest position of the selected magazine lane may be instructed or actuated, thereby causing release of the container from the lowest position. Further, a controller may instruct the actuation mechanism of the lowest position of the magazine lane to release a container.

The process 800 may continue to detect, by a sensor, release of the correct container from the lowest position, as at 808. For example, one or more sensors may be provided proximate a lowest position of the selected magazine lane, and/or proximate a portion of the slide that will receive the released container. In one example, a sensor proximate the lowest position of the selected magazine lane may detect a presence of a container prior to instructing the actuation mechanism, and/or may subsequently detect an absence of a container after instructing the actuation mechanism. In another example, a sensor proximate a portion of the slide may detect an absence of a container prior to instructing the actuation mechanism, and/or may subsequently detect a presence or movement of a container after instructing the actuation mechanism. In addition, the sensors proximate the magazine lane and/or proximate the slide may detect and identify the container, e.g., by scanning an identifier, barcode, or other indicia on the container. Further, a controller may receive data from the sensors associated with detection and/or identification of release of correct containers.

The process 800 may proceed to determine whether a correct container has been released, as at 810. For example, based on data received from one or more sensors, it may be determined that a container was successfully released from the selected magazine lane. Alternatively, based on data received from one or more sensors, it may be determined that no container was released from the selected magazine lane, e.g., because no container was present at the lowest position, or because of an error or issue preventing release of a container from the lowest position. In addition, based on the detection and identification of the container by the sensors, an identifier, type, size, or other characteristics of the container may be compared with characteristics of an expected or requested container to determine if a correct container was released. Further, a controller may determine whether a correct container has or has not been released.

If it is determined that a correct container has not been successfully released, the process 800 may continue with a container indexing in magazine process 900. For example, if no container was present in the lowest position, the container indexing process may move or index containers within the selected magazine lane downward among the vertical positions of the magazine lane, in order to position a container at the lowest position. Further, a controller may instruct the container indexing in magazine process. Further details of the container indexing in magazine process are described herein at least with respect to FIG. 9. Then, the process 800 may return to step 806 to instruct release of a container from the lowest position of the magazine lane.

In further example embodiments, alternatively or in addition to the container indexing in magazine process, one or more corrective actions may be performed to correct errors, issues, or other problems that may have resulted in release of no container or release of an incorrect container. Example corrective actions may include stopping operations of the magazine lane and/or magazine body, requesting assistance from an associate or other facility personnel, determining a different container having slightly larger dimensions to release to allow operations to continue at the work surface, providing audio, visual, or other feedback to alert the associate or other facility personnel of an incorrect container or other errors, and/or various other corrective actions. Further, a controller may instruct one or more corrective actions as a result of no container, an incorrect container, or other errors. Then, concurrently with or subsequently to performing one or more corrective actions, the process 800 may return to step 806 to instruct release of a container from the lowest position of the magazine lane.

If, however, it is determined that a correct container has been successfully released, the process 800 may proceed with causing sliding of the container along the slide, as at 812. For example, the slide may include passive and/or active structures or components to guide the container from the selected magazine lane to a work surface. In some examples, the released container may move or slide, e.g., under force of gravity, along portions of the slide toward the work surface. In addition, responsive to determining that the correct container has been released, audio, visual, or other feedback may be provided to confirm to the associate that the correct container has been released, such that operations at the work surface should continue. Further, the container may be associated, e.g., in a data store or memory, with the operation being performed at the work surface, such as an item packing operation. Moreover, various sensors or auxiliary devices may be associated with portions of the slide to detect, identify, print, label, or otherwise manipulate the container during movement along the slide. In some examples, during sliding and guidance of the correct container to a work surface, an additional label or other information, e.g., a packing label or shipping label, may be applied or printed onto the container. Further, a controller may instruct or control movement of the container along the slide.

The process 800 may then continue by causing transfer of the container from the slide to the work surface, as at 814. For example, the slide and/or the work surface may include passive and/or active structures or components to guide the container from the slide to the work surface. In some examples, the released container may move or slide, e.g., under force of gravity, along portions of the slide and directly onto the work surface, which may include one or more stops to retain the container on the work surface. Various sensors or auxiliary devices may be associated with portions of the work surface to detect, identify, print, label, or otherwise manipulate the container during transfer to, or as part of processing on, the work surface. Further, a controller may instruct or control transfer of the container from the slide to the work surface.

The process 800 may then proceed to the container indexing in magazine process 900. For example, upon release of a container from the lowest position of a selected magazine lane and subsequent transfer of the container to the slide and work surface, the container indexing process may move or index containers within the selected magazine lane downward among the vertical positions of the magazine lane, in order to position another container at the lowest position ready for release. Further, a controller may instruct the container indexing in magazine process. Further details of the container indexing in magazine process are described herein at least with respect to FIG. 9.

Then, the process 800 may end, as at 816.

Figure 9:
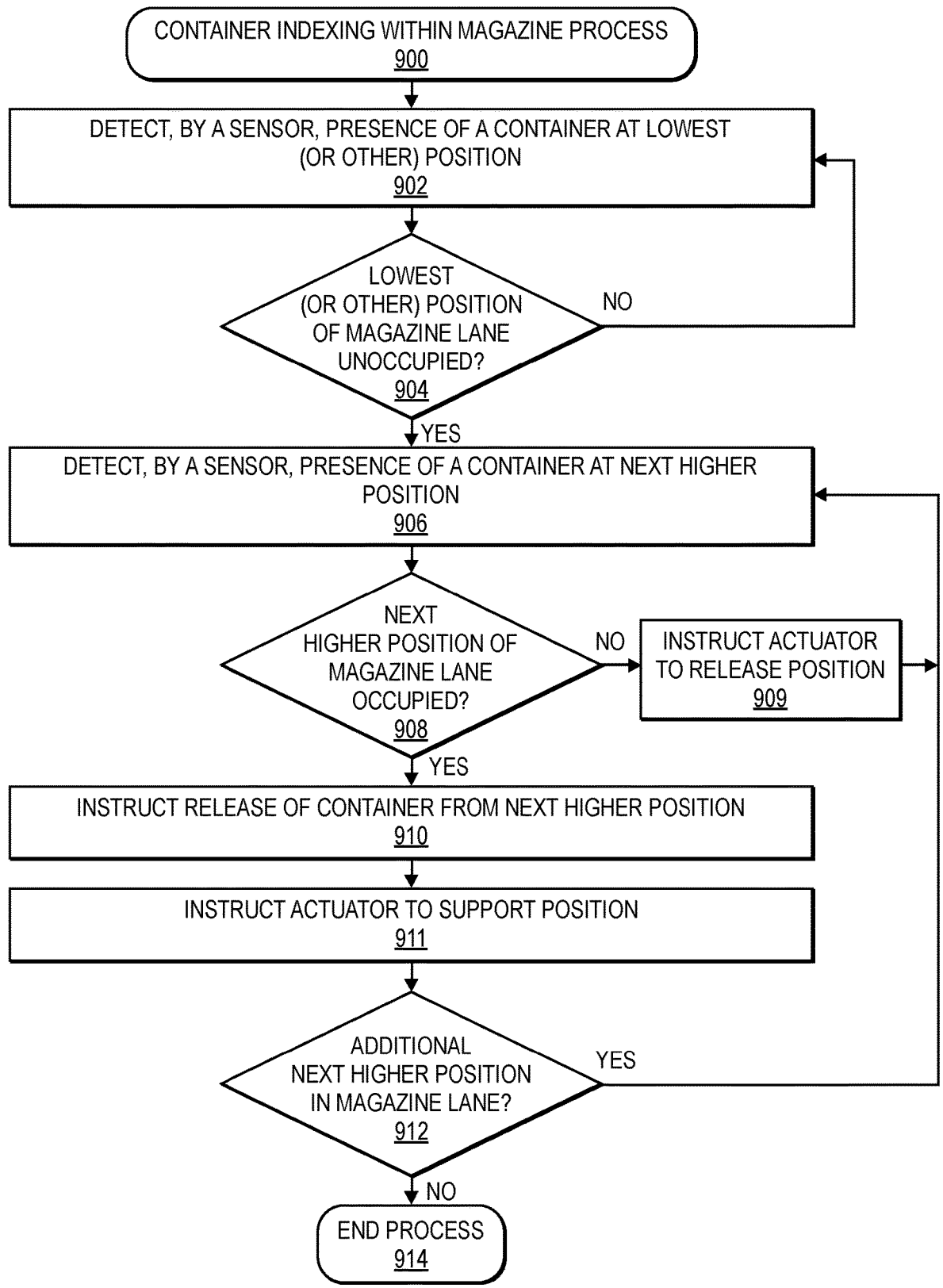
FIG. 9 is a flow diagram illustrating an example container indexing within magazine process, in accordance with implementations of the present disclosure.

FIG. 9 is a flow diagram illustrating an example container indexing within magazine process 900, in accordance with implementations of the present disclosure.

The process 900 may begin by detecting, by a sensor, a presence of a container at a lowest (or other) position, as at 902. For example, a sensor associated with the lowest vertical position of a magazine lane may detect whether a container is present at the lowest position. In addition, one or more sensors associated with other vertical positions of the magazine lane may also detect whether a container is present at respective vertical positions. Further, a controller may receive data from one or more sensors related to presence or absence of containers at respective vertical positions.

The process 900 may continue by determining whether the lowest (or other) position of a magazine lane is unoccupied, as at 904. For example, if a container was just released from the lowest position of a magazine lane, it may be determined that the lowest position is unoccupied, e.g., based on data from a respective sensor associated with the lowest position. In addition, it may be determined that another position within a magazine lane is unoccupied, e.g., based on data from a respective sensor associated with the position. In some examples, if a plurality of vertical positions within a magazine lane are determined to be unoccupied, a lowest unoccupied vertical position among the plurality of unoccupied vertical positions may be selected or determined for further operations. Further, a controller may determine whether a lowest (or other) position of a magazine lane is unoccupied.

If the lowest position is occupied, and/or if all vertical positions of a magazine lane are occupied, the process 900 may return to step 902 to continue to detect presence or absence of containers at various positions of a magazine lane.

However, if the lowest position is unoccupied, and/or if one or more other vertical positions of a magazine lane are unoccupied, the process 900 may proceed by detecting, by a sensor, a presence of a container at a next higher position, as at 906. For example, a sensor associated with the next higher vertical position above an unoccupied position of a magazine lane may detect whether a container is present at the next higher vertical position. Further, a controller may receive data from one or more sensors related to presence or absence of a container at the next higher vertical position.

The process 900 may continue to determine whether the next higher vertical position of the magazine lane is occupied, as at 908. In some examples, generally all vertical positions may be occupied, whereas in other examples, one or more vertical positions may be unoccupied for various reasons. Further, a controller may determine whether a next higher vertical position of a magazine lane is occupied. If the next higher vertical position is not occupied, the process 900 may return to step 906 to continue to detect presence or absence of containers at additional next higher vertical positions of a magazine lane. In further examples in which the next higher vertical position is not occupied, an actuation mechanism associated with the next higher position may be actuated to a release or open position, as at 909, prior to detecting presence or absence of containers at additional next higher vertical positions. In this manner, a container may be released and indexed down multiple unoccupied vertical positions at once, without requiring separate or individual actuations at every unoccupied vertical position. This may provide faster and more efficient indexing or movement of containers to substantially fill and maintain occupancy of all vertical positions within a magazine lane by respective containers.

If, however, the next higher vertical position is occupied, the process 900 may proceed to instruct release of the container from the next higher vertical position, as at 910. For example, upon determining that a container is present at the next higher vertical position, the container from the next higher vertical position above the unoccupied position of the selected magazine lane may be released. An actuation mechanism associated with the next higher vertical position of the selected magazine lane may be instructed or actuated, thereby causing release of the container from the next higher vertical position to the unoccupied position. Furthermore, upon receipt of the released container at an unoccupied position, or at the lowest unoccupied position in the case of multiple unoccupied positions that are stacked relative to each other, an actuation mechanism associated with the next higher vertical position above the now occupied vertical position may be actuated to a support or closed position, as at 911, such that any additional released containers may be received and supported at the next higher position that may remain empty. In this manner, a container may be released and indexed down one or multiple unoccupied vertical positions at once, without requiring separate or individual actuations at every unoccupied empty vertical position, while also still ensuring receipt of only one container at each vertical position. Further, a controller may instruct the actuation mechanism of the next higher vertical position of the magazine lane to release a container.

The process 900 may then continue with determining whether there are additional next higher positions in the magazine lane, as at 912. For example, after releasing a container such that the next higher vertical position is now unoccupied, it may be determined whether there are additional next higher vertical positions within the magazine lane from which to continue to move or index containers downward along the magazine lane. Further, a controller may determine whether there are additional next higher vertical positions within the magazine lane.

If it is determined that there are additional next higher vertical positions within the magazine lane, the process 900 may return to step 906 to detect, by a sensor, a presence of a container at another next higher vertical position, and continue to move or index containers downward along the magazine lane. If, however, it is determined that there are no additional next higher positions in the magazine lane, e.g., a highest vertical position of the magazine lane is unoccupied, an additional or new container may be received at the highest vertical position of the magazine lane from an upstream station or process.

Then, the process 900 may end, as at 914.

Although the process of FIG. 9 is generally described in the context of a magazine body having individual sensors associated with each vertical position of a magazine lane, other example embodiments of the process described with respect to FIG. 9 may be modified based on other types, numbers, arrangements, or combinations of sensors that may be associated with a magazine body. For example, the process may be modified if there is a subset of sensors associated with only a subset of vertical positions of a magazine lane. In addition, the process may be further modified if there is only a sensor associated with a lowest vertical position of a magazine lane, and/or if there is only a sensor associated with a highest vertical position of a magazine lane. Further, the process may be still further modified if there is a ranging or distance sensor with a field of view that points downward within a magazine lane, or if there is a ranging or distance sensor with a field of view that points upward within a magazine lane. Moreover, if no sensors are associated with a magazine lane, the process may be further modified to simultaneously, concurrently, and/or sequentially move or index containers among the vertical positions of a magazine lane.

Generally, for any vertical positions of a magazine lane that do not have associated sensors or sensor data, actuation mechanisms of such vertical positions may be operated substantially according to an open-loop control method responsive to release of a container from a lowest position of the magazine lane. For example, the actuation mechanisms may be actuated sequentially, e.g., sequentially vertically upward along the vertical positions, under the assumption that a container is present at such vertical positions of the magazine lane.

Further, although FIG. 9 is generally described herein in the context of indexing containers within a magazine lane responsive to failure to release from a lowest position, absence of a container at a lowest position, or successful release of a container from a lowest position of a magazine lane, as described with respect to FIG. 8, other example embodiments may include operation or execution of the process of FIG. 9 substantially independently from the container release process of FIG. 8. For example, the presence or absence of containers at one or more vertical positions within a magazine lane may be detected, checked, or verified by one or more sensors continuously, intermittently, or periodically, in order to ensure that all, or substantially all, vertical positions remain occupied by received containers. In this manner, containers may be accumulated and maintained readily available for release and delivery to one or more workstations or work surfaces as needed. In additional example embodiments, a rate of indexing containers within a magazine lane may generally be designed or configured to be equal to or faster than a rate of releasing containers from the magazine lane, in order to ensure that sufficient containers can be accumulated and maintained ready for release and delivery as needed.

Using the processes and methods described herein at least with respect to FIGS. 7-9, one or more containers may be requested from automated container accumulation and delivery systems to perform various operations with respect to containers and/or items, such as packing, picking, sorting, storing, shipping, or others. Upon requesting a container, the container may be selected, identified, and released from a magazine lane of a magazine body, and the container may move along a slide to a work surface for processing. Further, upon releasing the container from the magazine lane of the magazine body, remaining containers within the magazine lane may be moved or indexed downward to prepare another container for release from a lowest position of the magazine lane, and/or to substantially fill any unoccupied vertical positions within the magazine lane, as well as to receive additional containers within the magazine lane from upstream stations or processes. In this manner, the automated container accumulation and delivery systems and methods described herein may receive, store, sort, release, and deliver containers as needed or requested by processing stations or other downstream operations.

Figure 10:
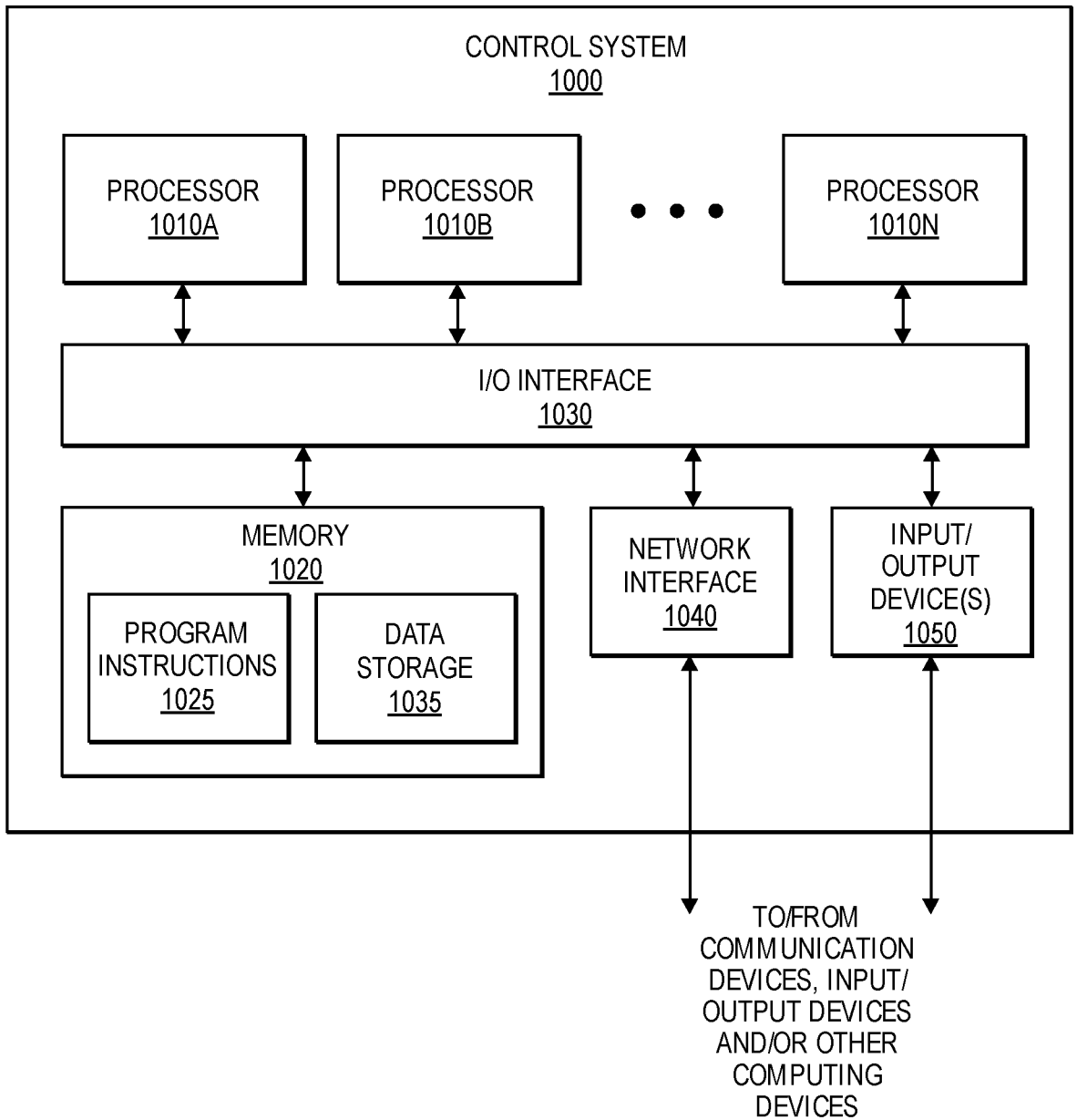
FIG. 10 is a block diagram illustrating various components of an example control system, in accordance with implementations of the present disclosure.

FIG. 10 is a block diagram illustrating various components of an example control system 1000, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 10. In the illustrated implementation, a control system 1000 includes one or more processors 1010A, 1010B through 1010N, coupled to a non-transitory computer-readable storage medium 1020 via an input/output (I/O) interface 1030. The control system 1000 further includes a network interface 1040 coupled to the I/O interface 1030, and one or more input/output devices 1050. In some implementations, it is contemplated that a described implementation may be implemented using a single instance of the control system 1000 while, in other implementations, multiple such systems or multiple nodes making up the control system 1000 may be configured to host different portions or instances of the described implementations. For example, in one implementation, some data sources or services (e.g., related to portions of container accumulation and delivery systems, operations, or processes, etc.) may be implemented via one or more nodes of the control system 1000 that are distinct from those nodes implementing other data sources or services (e.g., related to other portions of container accumulation and delivery systems, operations, or processes, etc.).

In various implementations, the control system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer-readable storage medium 1020 or the control system 1000. Generally speaking, a non-transitory, computer-readable storage medium may include storage media or memory media such as magnetic or optical media, e.g., disk or CD/DVD-ROM, coupled to the control system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices, including the network interface 1040 or other peripheral interfaces, such as input/output devices 1050. In some implementations, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the control system 1000 and other devices attached to a network, such as other control systems, material handling system controllers, warehouse management systems, other computer systems, robotic or automated arms, machines, or systems, various types of sensors, various types of vision systems, imaging devices, or imaging sensors, upstream stations or processes, downstream stations or processes, other material handling systems or equipment, or between nodes of the control system 1000. In various implementations, the network interface 1040 may support communication via wired or wireless general data networks, such as any suitable type of Ethernet network.

Input/output devices 1050 may, in some implementations, include one or more displays, monitors, projection devices, other video input/output devices, speakers, microphones, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1000. Multiple input/output devices 1050 may be present in the control system 1000 or may be distributed on various nodes of the control system 1000. In some implementations, similar input/output devices may be separate from the control system 1000 and may interact with one or more nodes of the control system 1000 through a wired or wireless connection, such as over the network interface 1040.

As shown in FIG. 10, the memory 1020 may include program instructions 1025 that may be configured to implement one or more of the described implementations and/or provide data storage 1035, which may comprise various tables, data stores and/or other data structures accessible by the program instructions 1025. The program instructions 1025 may include various executable instructions, programs, or applications to facilitate container accumulation and delivery operations and processes described herein, such as magazine body controllers, drivers, or applications, slide controllers, drivers, or applications, work surface controllers, drivers, or applications, actuation mechanism or actuator controllers, drivers, or applications, damper mechanism controllers, drivers, or applications, sensor controllers, drivers, or applications, sensor data processing applications, auxiliary device controllers, drivers, or applications, imaging or scanning device controllers, drivers, or applications, imaging or scanning data processing applications, conveyance mechanism controllers, drivers, or applications, material handling equipment controllers, drivers, or applications, upstream station controllers, drivers, or applications, downstream station controllers, drivers, or applications, etc. The data storage 1035 may include various data stores for maintaining data related to systems, operations, or processes described herein, such as magazine bodies, slides, work surfaces, actuation mechanisms or actuators, damper mechanisms, sensors, sensor data, auxiliary devices, imaging or scanning devices, imaging or scanning data, boxes, containers, container data, items or objects, item or object data, conveyance mechanisms, material handling equipment or apparatus, upstream systems, stations, or processes, downstream systems, stations, or processes, etc.

Those skilled in the art will appreciate that the control system 1000 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7-9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A container processing system, comprising:
   an inbound conveyance mechanism configured to transport an item proximate a work surface;
   a container accumulation system configured to provide a container to the work surface, the container accumulation system comprising:
   a magazine body including a plurality of magazine lanes, each magazine lane including a plurality of vertical positions configured to receive a respective plurality of containers, each magazine lane configured to move the plurality of containers downward along the plurality of vertical positions, each vertical position of a respective magazine lane being configured to receive a respective container, and each vertical position including a respective actuation mechanism configured to selectively support or release the respective container relative to the vertical position;
   a slide positioned below a lowest vertical position of the plurality of vertical positions of the magazine body and configured to guide containers released from the plurality of magazine lanes; and
   the work surface configured to receive containers guided by the slide; and
   an outbound conveyance mechanism configured to transport the container with the item away from the work surface.

2. The container processing system of claim 1, wherein the inbound and outbound conveyance mechanisms comprise at least one of conveyors, belts, rollers, wheels, robotic arms, or autonomous vehicles.

3. The container processing system of claim 1, wherein the slide includes an angle of inclination of approximately 25 degrees to horizontal; and
   wherein the slide includes at least one of passive components or active components configured to guide containers from the magazine body to the work surface.

4. The container processing system of claim 1, wherein the work surface includes at least one stop configured to retain containers received from the slide.

5. A container accumulation system, comprising:
   a magazine body including at least one magazine lane, the at least one magazine lane including a plurality of vertical positions configured to receive a respective plurality of containers, the at least one magazine lane configured to move the plurality of containers downward along the plurality of vertical positions, and each vertical position including a respective actuation mechanism configured to selectively support or release a respective container relative to the vertical position;
   a slide positioned below a lowest vertical position of the plurality of vertical positions of the magazine body and configured to guide a container released from the at least one magazine lane; and
   a surface configured to receive the container released from the at least one magazine lane and guided by the slide.

6. The container accumulation system of claim 5, wherein the at least one magazine lane comprises a frame and a vertical guide that form a substantially vertical lane including the plurality of vertical positions configured to receive the respective plurality of containers.

7. The container accumulation system of claim 6, wherein at least one of the frame or the vertical guide is adjustable to modify at least one dimension of the at least one magazine lane.

8. The container accumulation system of claim 5, wherein at least one vertical position includes a sensor configured to detect an absence or presence of a respective container at the at least one vertical position.

9. The container accumulation system of claim 5,
wherein a plurality of actuation mechanisms associated with the plurality of vertical positions are configured to actuate at least one of simultaneously, concurrently, or sequentially to move containers down the at least one magazine lane.

10. The container accumulation system of claim 5, wherein the slide comprises at least one surface having an angle of inclination configured to receive and guide the container to the surface; and
wherein the at least one surface of the slide includes at least one of a bar, pole, rod, beam, plate, surface, belt, roller, wheel, or ball to guide the container.

11. The container accumulation system of claim 5, wherein the slide comprises at least one damper mechanism configured to dissipate an energy of the container released from the at least one magazine lane and guided by the slide;
wherein the damper mechanism comprises at least one of a rotary damper, linear damper, viscous damper, friction damper, or spring.

12. The container accumulation system of claim 5, wherein the surface is vertically adjustable; and
wherein the slide is coupled to the surface, such that the slide moves with a vertical adjustment of the surface and relative to the magazine body.

13. The container accumulation system of claim 5, wherein the surface is vertically adjustable; and
wherein the slide is pivotably coupled to at least one of the surface or the magazine body, such that the slide at least one of moves or rotates in response to a vertical adjustment of the surface.

14. A container accumulation method, comprising:
causing, by a controller, at least one magazine lane of a magazine body to receive a plurality of containers at a respective plurality of vertical positions of the at least one magazine lane, the at least one magazine lane configured to move the plurality of containers downward along the plurality of vertical positions, and each vertical position including a respective actuation mechanism configured to selectively support or release a respective container relative to the vertical position;
in response to a request, causing, by the controller, a respective actuation mechanism to release a container from a lowest vertical position of the at least one magazine lane;
causing, by the controller, a slide to receive the container from the lowest vertical position and guide the container to a work surface; and
causing, by the controller, the work surface to receive the container from the slide.

15. The container accumulation method of claim 14, further comprising:
receiving, by the controller, the request to release the container;
wherein the request comprises at least one of an identifier associated with an item to be packed into the container, an operational state of the work surface, or an input received from an associate.

16. The container accumulation method of claim 15, further comprising:
determining, by the controller, to release the container from the lowest vertical position of the at least one magazine lane based on the request.

17. The container accumulation method of claim 14, further comprising:
subsequent to release of the container from the lowest vertical position, detecting, by a sensor, the container released from the lowest vertical position of the at least one magazine lane; and
determining, by the controller, that the container released from the lowest vertical position is a correct container based on an identifier associated with the container.

18. The container accumulation method of claim 14, further comprising:
detecting, by a sensor, an unoccupied vertical position of the at least one magazine lane; and
causing, by the controller, respective actuation mechanisms to move one or more containers downward from one or more respective vertical positions above the unoccupied vertical position of the at least one magazine lane.

* * * * *